(12) United States Patent
Kim et al.

(10) Patent No.: US 11,069,245 B2
(45) Date of Patent: Jul. 20, 2021

(54) LANE CHANGE TIMING INDICATOR

(71) Applicant: TOYOTA JIDOSHA KABUSHIKI KAISHA, Toyota (JP)

(72) Inventors: BaekGyu Kim, Mountain View, CA (US); Shinichi Shiraishi, Tokyo (JP)

(*) Notice: Subject to any disclaimer, the term of this patent is extended or adjusted under 35 U.S.C. 154(b) by 88 days.

(21) Appl. No.: 15/978,324

(22) Filed: May 14, 2018

(65) Prior Publication Data
US 2019/0347939 A1  Nov. 14, 2019

(51) Int. Cl.
| | |
|---|---|
| G08G 1/16 | (2006.01) |
| B60W 50/14 | (2020.01) |
| B60R 1/12 | (2006.01) |
| B60R 1/00 | (2006.01) |
| G02B 27/01 | (2006.01) |

(52) U.S. Cl.
CPC ............. *G08G 1/167* (2013.01); *B60R 1/001* (2013.01); *B60R 1/12* (2013.01); *B60W 50/14* (2013.01); *G02B 27/01* (2013.01); *G08G 1/166* (2013.01); *B60R 2001/1215* (2013.01); *B60R 2300/804* (2013.01); *B60R 2300/8086* (2013.01); *B60W 2050/146* (2013.01); *B60W 2520/10* (2013.01); *B60W 2554/804* (2020.02); *G02B 2027/0141* (2013.01); *G02B 2027/0196* (2013.01)

(58) Field of Classification Search
CPC ........ G08G 1/167; G08G 1/166; G02B 27/01; G02B 2027/0141; G02B 2027/0196; B60R 2300/804; B60R 2300/8086; B60R 1/12; B60R 1/001; B60R 2001/1215; B60W 2050/146; B60W 50/14; B60W 2550/302; B60W 2520/10
USPC ........................................................ 701/301
See application file for complete search history.

(56) References Cited

U.S. PATENT DOCUMENTS

| | | | | |
|---|---|---|---|---|
| 6,882,287 | B2 * | 4/2005 | Schofield ............... | B60Q 1/346 340/903 |
| 2012/0154591 | A1 * | 6/2012 | Baur ........................ | B60R 1/00 348/148 |
| 2018/0188735 | A1 * | 7/2018 | Sugawara .......... | G06K 9/00805 |
| 2018/0286242 | A1 * | 10/2018 | Talamonti ............. | B60W 30/14 |

\* cited by examiner

*Primary Examiner* — Maceeh Anwari
(74) *Attorney, Agent, or Firm* — Burbage Law, P.C.; Jon-Michael Burbage; Elizabeth Ruzich

(57) ABSTRACT

The disclosure includes embodiments of a lane change timing indicator for a connected vehicle. In some embodiments, a method includes determining a time and a path for an ego vehicle to change lanes. In some embodiments, the method includes displaying, on an electronic display device of the ego vehicle, one or more graphics that depict the time and the path.

20 Claims, 10 Drawing Sheets

BSM DATA 197

- Vehicles and other client devices equipped with Dedicated Short Range Communication ("DSRC") transmit a Basic Safety Message ("BSM") at a regular interval.

- Each BSM includes the following BSM data describing one or more of the following for the vehicle that originally sent the BSM:
  (1) GPS Data Describing the Location of the Vehicle, where the GPS Data may be so accurate that it describes the specific parking space the Vehicle is parked in;
  (2) Heading Data Describing a past Direction of travel for the Vehicle, if any;
  (3) Velocity Data Describing a past Velocity of the Vehicle; and
  (4) Path History of Vehicle (e.g., path history data).

Figure 4

BSM DATA 197

Part 1
GPS Data (local 3D)
- Latitude
- Longitude
- Elevation
- Positional accuracy
- Time Vehicle Motion Data describing one or more of the following for the vehicle:
- Transmission state
- Speed
- Heading
- Steering wheel angle
- Acceleration set (4-way, i.e., 3 axes of acceleration plus yaw rate)
- Brake system status Vehicle Size Data describing a size of the vehicle

Part 2
Vehicle Path History
Future Vehicle Path Estimation
Hard Active Braking
Traction Control System active over 100 milliseconds?
Antilock Brake System active over 100 milliseconds?
Light Status
Wiper Status
Vehicle Type

Figure 5

LANE CHANGE TIMING INDICATOR

BACKGROUND

The specification relates to a lane change timing indicator for a connected vehicle.

A report from the U.S. department of Transportation says that 9% of all police-reported vehicle accidents involve lane change events. One problem with changing lanes is that it can be difficult for a driver of an "ego vehicle" to judge the right time to change lanes if other drivers are traveling at speeds that are very different from the speed of the ego vehicle.

SUMMARY

Described herein are embodiments of a lane change timing system installed in a connected vehicle referred to herein as an "ego vehicle." In some embodiments, the lane change timing system includes software installed in an Electronic Control Unit (ECU) or some other onboard vehicle computer of the ego vehicle. In some embodiments, the lane change timing system is a new type of Advance Driver Assistance System ("ADAS") that helps a driver of the ego vehicle to manually change lanes at an optimum time based on the behavior of nearby vehicles (i.e., "perimeter vehicles"), the state of the driver's ego vehicle (e.g., its speed, acceleration, heading, etc.) and the preferences of the driver.

In some embodiments, the lane change timing system monitors for lane change events which are indicated when the driver turns on the turning signal system of the ego vehicle. When the turning signal system is turned on, the lane change timing system begins providing its functionality by determining which direction the driver wants to go to change lane based on whether the left or right turning signal system is turned on. The lane change timing system analyzes sensor data describing the behavior of the perimeter vehicles, as well as the state of the ego vehicle, to determine an optimum time for the driver to start changing lanes in the direction indicated by the turning signal system.

In some embodiments, the sensor data is received by the lane change timing system in one or more of the following ways: (1) it is recorded by the onboard sensors of the ego vehicle; and (2) it is received via wireless Vehicle-to-Vehicle (V2V) messages received from the perimeter vehicles or wireless Vehicle-to-Infrastructure (V2I) messages received from a Roadside Unit (RSU). In some embodiments, these wireless messages are referred to as Vehicle-to-Anything (V2X) messages as this term encompasses both V2V and V2I communications, and either or both of V2V and V2I communications are suitable for use by the embodiments described herein.

In some embodiments, the lane change timing system generates and provides visual feedback that informs the driver about the optimum time to change lanes. The visual feedback is provided by one or more of the following: a Heads-Up Display unit (HUD); and an electronic display installed in the side mirror of the ego vehicle. In some embodiments, the visual feedback includes one or more of the following types of information for the driver: (1) an optimum time to being changing lanes to the lane indicated by the activated turning signal system; and (2) a path that the driver should take to complete the lane change. In some embodiments, the path describes a path of travel from a current lane to a target lane. In some embodiments, the lane change timing system also helps the driver to avoid a collision.

Although the embodiments of the lane change timing system are discussed here in relation to lane changing, the functionality provided by the lane change timing system can be extended to other driving scenarios such as merging according to other embodiments.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: determining a time and a path for an ego vehicle to change lanes; and displaying, on an electronic display device of the ego vehicle, one or more graphics that depict the time and the path. Other embodiments of this aspect include corresponding computer systems, apparatus, and computer programs recorded on one or more computer storage devices, each configured to perform the actions of the methods.

Implementations may include one or more of the following features. The method where time and the path are determined by an onboard vehicle computer system of the ego vehicle. The method where the time and the path are determined based on ego vehicle information that describes the ego vehicle and perimeter vehicle information that describes one or more perimeter vehicles. The method where the path includes instructions to move from a current lane to a target lane and the one or more perimeter vehicles are traveling in the target lane. The method where the instructions are graphical instructions. The method where the time and the path are determined based on one or more of the following: relative locations of the ego vehicle and the one or more perimeter vehicles; relative velocities of the ego vehicle and the one or more perimeter vehicles; relative headings of the ego vehicle and the one or more perimeter vehicles; and relative path histories of the ego vehicle and the one or more perimeter vehicles. The method where the electronic display device is selected from a group that includes: an electronic display installed in a side mirror of the ego vehicle; a HUD installed in a windshield of the ego vehicle; and a Three-Dimensional Heads-Up Display unit (3D-HUD) installed in the windshield of the ego vehicle. The method where the method is triggered by an activation of a turning signal of the ego vehicle. The method where the turning signal indicates a target lane for the path. Implementations of the described techniques may include hardware, a method or process, or computer software on a computer-accessible medium.

One general aspect includes a system of an ego vehicle including: an electronic display device; a non-transitory memory; a processor communicatively coupled to the electronic display device and the non-transitory memory, where the non-transitory memory stores computer code that is operable, when executed by the processor, to cause the processor to: determine, by the processor, a time and a path for an ego vehicle to change lanes; display, on the electronic display device, one or more graphics that depict the time and the path. Other embodiments of this aspect include corresponding computer systems, apparatus, and computer programs recorded on one or more computer storage devices, each configured to perform the actions of the methods.

Implementations may include one or more of the following features. The system where the time and the path are determined based on ego vehicle information that describes the ego vehicle and perimeter vehicle information that describes one or more perimeter vehicles. The system where the path includes instructions to move from a current lane to a target lane and the one or more perimeter vehicles are traveling in the target lane. The system where the time and the path are determined based on one or more of the following: relative locations of the ego vehicle and the one or more perimeter vehicles; relative velocities of the ego vehicle and the one or more perimeter vehicles; relative headings of the ego vehicle and the one or more perimeter vehicles; and relative path histories of the ego vehicle and the one or more perimeter vehicles. The system where the electronic display device is selected from a group that includes: an electronic display installed in a side mirror of the ego vehicle; a HUD installed in a windshield of the ego vehicle; and a 3D-HUD installed in the windshield of the ego vehicle. The system where the computer code is further operable, when executed by the processor, to monitor for an activation of a turning signal of the ego vehicle. Implementations of the described techniques may include hardware, a method or process, or computer software on a computer-accessible medium.

One general aspect includes a computer program product of an ego vehicle including instructions that, when executed by one or more processors of the ego vehicle, cause the one or more processors to perform operations including: determining a time and a path for an ego vehicle to change lanes; and displaying, on an electronic display device of the ego vehicle, one or more graphics that depict the time and the path. Other embodiments of this aspect include corresponding computer systems, apparatus, and computer programs recorded on one or more computer storage devices, each configured to perform the actions of the methods.

Implementations may include one or more of the following features. The computer program product where the time and the path are determined based on ego vehicle information that describes the ego vehicle and perimeter vehicle information that describes one or more perimeter vehicles. The computer program product where the path includes instructions to move from a current lane to a target lane and the one or more perimeter vehicles are traveling in the target lane. The computer program product where the time and the path are determined based on one or more of the following: relative locations of the ego vehicle and the one or more perimeter vehicles; relative velocities of the ego vehicle and the one or more perimeter vehicles; relative headings of the ego vehicle and the one or more perimeter vehicles; and relative path histories of the ego vehicle and the one or more perimeter vehicles. The computer program product where the electronic display device is selected from a group that includes: an electronic display installed in a side mirror of the ego vehicle; a HUD installed in a windshield of the ego vehicle; and a 3D-HUD installed in the windshield of the ego vehicle. The computer program product where the operations further include monitoring for an activation of a turning signal of the ego vehicle. Implementations of the described techniques may include hardware, a method or process, or computer software on a computer-accessible medium.

Drivers sometimes struggle to know when it is safe to change lanes. For example, it can be hard to judge how fast perimeter vehicle are traveling in the target lane, and whether it is safe to attempt to change lanes. It can also be difficult for some drivers to discern a path to travel to complete the lane change. In some embodiments, the lane change timing indicator improves the performance of the ego vehicle by providing increased functionality to the ego vehicle that: determines an optimum time to change lanes and a path to travel to complete the lane change; and displays graphical information that informs the driver of the optimum time and the path. In some embodiments, the electronic displays that display the graphical information are situated in the ego vehicle so that they are in natural positions that a driver would look to when they are attempting to change lanes. For example, it is natural for a driver to look in the corner of their front windshield or their side view mirror when attempting to change lanes. In some embodiments, the lane change timing system is a new ADAS system that helps drivers to better judge when it is safe to change lanes. Our research indicates that the lane change timing system will help the driver and the ego vehicle avoid collisions because the lane change timing system improves the performance of the ego vehicle by informing the driver of the ego vehicle about the optimum time to change lanes and the path to travel when changing lanes.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4 and 5 are block diagrams illustrating an example of Basic Safety Message (BSM) data according to some embodiments.

DETAILED DESCRIPTION

Figure 1A:
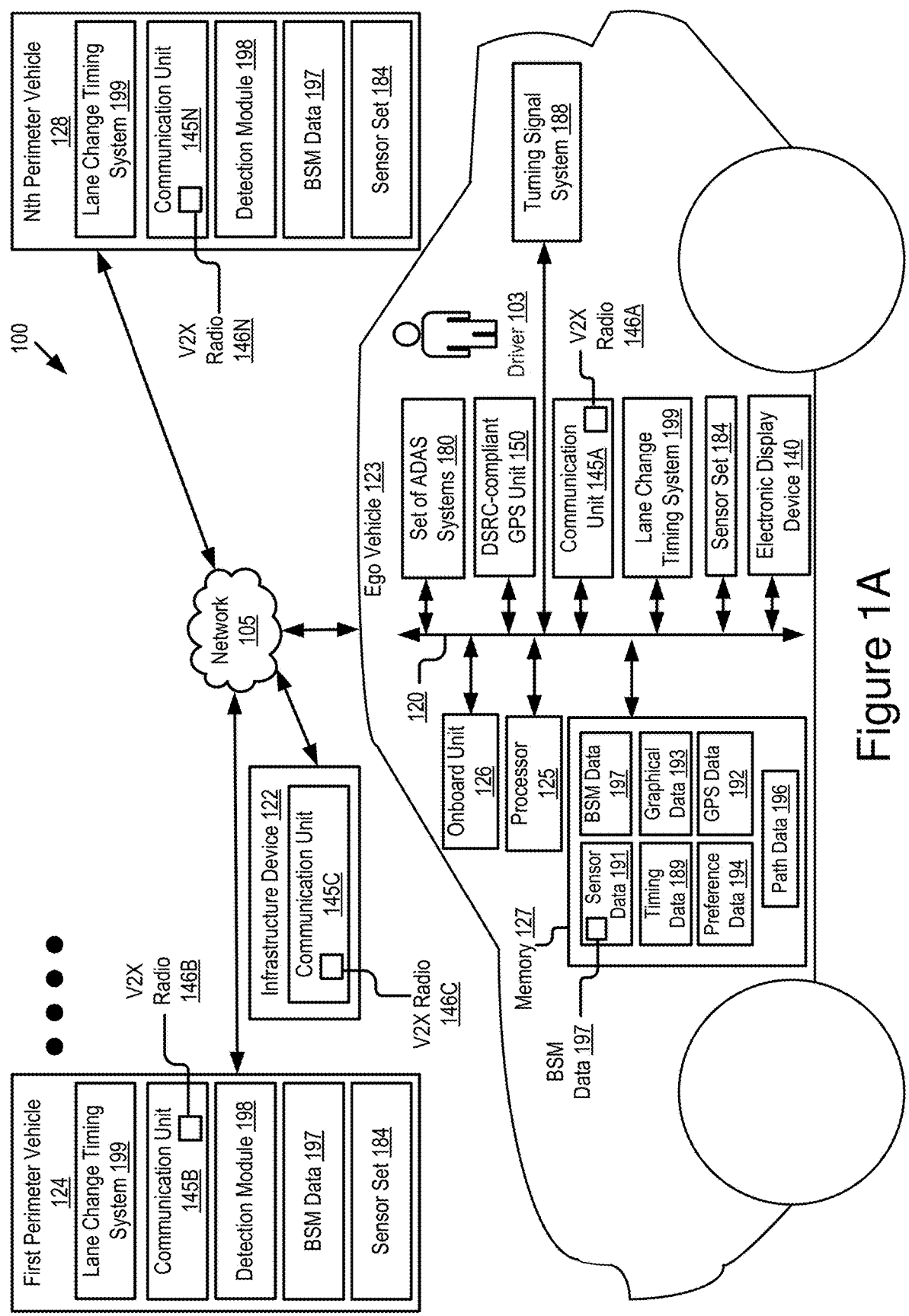
FIG. 1A is a block diagram illustrating an operating environment for a lane change timing system according to some embodiments.

Connected vehicles have access to many different radio types such as the following: Dedicated Short-Range Communication (DSRC); Long-Term Evolution (LTE); wireless fidelity (WiFi); and millimeter wave (mmWave). Connected vehicles wirelessly communicate with other vehicles via Vehicle-to-Vehicle (V2V) communication. Connected vehicles wirelessly communicate with roadway infrastructure, such as Roadside Units ("RSU" if singular, "RSUs" if plural) via Vehicle-to-Infrastructure communication. Vehicle-to-Anything (V2X) communication is a term that encompasses both V2V communication and V2I communication, collectively or individually.

Embodiments of a lane change timing system are described. Examples of V2X communication that are compatible with the lane change timing system include one or more of the following types of wireless V2X communication: DSRC; LTE; mmWave; 3G; 4G; 5G; LTE-Vehicle-to-Anything (LTE-V2X); LTE-Vehicle-to-Vehicle (LTE-V2V); LTE-Device-to-Device (LTE-D2D); 5G-V2X; Intelligent Transportation System-G5 (ITS-G5); ITS-Connect; Voice over LTE (VoLTE); and any derivative or fork of one or more of the V2X communication protocols listed here.

In some embodiments, the connected vehicles that includes the lane change timing system are DSRC-equipped vehicles. A DSRC-equipped vehicle is a vehicle which: (1) includes a DSRC radio; (2) includes a DSRC-compliant Global Positioning System (GPS) unit; and (3) is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages. A DSRC-compliant GPS unit is operable to provide positional information for a vehicle (or some other DSRC-equipped device that includes the DSRC-compliant GPS unit) that has lane-level accuracy. The DSRC-compliant GPS unit is described in more detail below A "DSRC-equipped" device is a processor-based device that includes a DSRC radio, a DSRC-compliant GPS unit and is operable to lawfully send and receive DSRC messages in a jurisdiction where the DSRC-equipped device is located. Various endpoints may be DSRC-equipped devices, including, for example, a roadside unit (RSU), a smartphone, a tablet computer and any other processor-based computing device that includes a DSRC radio and is operable to lawfully send and receive DSRC messages as described above.

In some embodiments, an RSU that is a DSRC-equipped device does not include a DSRC-compliant GPS unit, but does include a non-transitory memory that stores digital data describing positional information for the RSU having lane-level accuracy, and the DSRC radio or some other system of the RSU inserts a copy of this digital data in the BSM data that is transmitted by the DSRC radio of the RSU. In this way, the RSU does not include a DSRC-compliant GPS unit but is still operable to distribute BSM data that satisfies the requirements for the DSRC standard. The BSM data is described in more detail below with reference to FIGS. 11 and 12 according to some embodiments.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In the United States, Europe, and Asia, DSRC messages are transmitted at 5.9 GHz. In the United States, DSRC messages are allocated 75 MHz of spectrum in the 5.9 GHz band. In Europe and Asia, DSRC messages are allocated 30 MHz of spectrum in the 5.9 GHz band. A wireless message, therefore, is not a DSRC message unless it operates in the 5.9 GHz band. A wireless message is also not a DSRC message unless it is transmitted by a DSRC transmitter of a DSRC radio.

Accordingly, a DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

The wireless messages of key fobs made as a component of a remote keyless entry system are not DSRC messages for additional reasons. For example, the payload for a DSRC message is also required to include digital data describing a rich amount of vehicular data of various types of data. In general, a DSRC message always includes, at a minimum, a unique identifier of the vehicle which transmits the DSRC message as well as the GPS data for that vehicle. This amount of data requires a larger bandwidth than what is possible for other types of non-DSRC wireless messages. The wireless messages of key fobs as a component of a remote keyless entry system are not DSRC messages because they do not include a payload which is permissible under the DSRC standard. For example, a key fob merely transmits a wireless message including a digital key which is known to a vehicle which is paired with the key fob; there is not sufficient bandwidth for other data to be included in the payload because the bandwidth allocated for these transmissions is very small. By comparison, DSRC messages are allocated large amounts of bandwidth and are required to include a far richer amount of data, including, for example, a unique identifier and the GPS data for the vehicle which transmitted the DSRC message.

In some embodiments, a DSRC-equipped vehicle does not include a conventional global positioning system unit ("GPS unit"), and instead includes a DSRC-compliant GPS unit. A conventional GPS unit provides positional information that describes a position of the conventional GPS unit with an accuracy of plus or minus 10 meters of the actual position of the conventional GPS unit. By comparison, a DSRC-compliant GPS unit provides GPS data (e.g., the GPS data 192) that describes a position of the DSRC-compliant GPS unit with an accuracy of plus or minus 1.5 meters of the actual position of the DSRC-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in on a roadway.

In some embodiments, a DSRC-compliant GPS unit is operable to identify, monitor and track its two-dimensional position within 1.5 meters of its actual position 68% of the time under an open sky.

A report from the U.S. department of Transportation says that 9% of all police-reported vehicle accidents involve lane change events. One problem with changing lanes is that it can be difficult for a driver of an "ego vehicle" to judge the right time to change lanes if other drivers are traveling at speeds that are very different from the speed of the ego vehicle. For example, this situation frequently occurs at rush hour when a vehicle in the middle lane attempts to move to the express lane.

In some embodiments, the lane change timing system is a new type of ADAS that helps a driver of the ego vehicle to manually change lanes at an optimum time based on one or more of the following: the behavior of nearby vehicles (i.e., "perimeter vehicles"); the state of the driver's ego vehicle (e.g., its speed, acceleration, heading, etc.); and the preferences of the driver.

In some embodiments, the lane change timing system provides the driver with visual feedback (e.g., a graphic). A significant challenge is the problem of how best to deliver visual information to the driver that allows them to have more confidence when they are changing lanes. The lane change timing system solves this problem, as well as others, by delivering novel visual information to the driver using either a HUD or a small electronic display installed in the side mirror of the vehicle. FIGS. 1B and 1C depict examples of the visual feedback provided by lane change timing system. FIG. 1B includes an example of a graphic 161 displayed by a HUD and FIG. 1C includes an example of a graphic 162 displayed by an electronic display of a side mirror. Note that both graphics 161, 162 include includes two types of information for the driver: (1) an optimum time to being changing lanes to the lane indicated by the activated turning signal system; and (2) a path that the driver should take to affect the lane change.

Described herein are embodiments of a lane change timing system installed in a connected vehicle referred to herein as an "ego vehicle." In some embodiments, the lane change timing system includes software installed in an ECU or some other onboard vehicle computer of the ego vehicle. In some embodiments, the lane change timing system is a new type of ADAS that helps a driver of the ego vehicle to manually change lanes at an optimum time based on the behavior of nearby vehicles (i.e., "perimeter vehicles"), the state of the driver's ego vehicle (e.g., its speed, acceleration, heading, etc.) and the preferences of the driver.

In some embodiments, the lane change timing system monitors for lane change events which are indicated when the driver turns on the turning signal system of the ego vehicle. When the turning signal system is turned on, the lane change timing system begins providing its functionality by determining which direction the driver wants to go to change lane based on whether the left or right turning signal system is turned on. The lane change timing system analyzes sensor data describing the behavior of the perimeter vehicles, as well as the state of the ego vehicle, to determine an optimum time for the driver to start changing lanes in the direction indicated by the turning signal system.

In some embodiments, the sensor data is received by the lane change timing system in one or more of the following ways: (1) it is recorded by the onboard sensors of the ego vehicle; and (2) it is received via wireless V2X messages received from the perimeter vehicles or a RSU that relays a V2X message from a perimeter vehicle to the ego vehicles (e.g., the ego vehicle is outside of the V2V transmission range of the perimeter vehicle but the RSU is not, and so, the RSU relays the wireless message from the perimeter vehicle to the ego vehicle assuming the ego vehicle is or becomes within transmission range of the RSU).

In some embodiments, the V2X messages that provide the sensor data describing the behavior of the perimeter vehicles is ideally provided via a Basic Safety Messages ("BSM" if singular or "BSMs" if plural) that are transmitted in accordance with the DSRC protocol. However, in practice the lane change timing system can utilize any form of V2X communication.

In some embodiments, the lane change timing system generates and provides visual feedback that informs the driver about the optimum time to change lanes. The visual feedback is provided by one or more of the following: a HUD; and an electronic display installed in the side mirror of the ego vehicle. In some embodiments, the visual feedback includes one or more of the following types of information for the driver: (1) an optimum time to being changing lanes to the lane indicated by the activated turning signal system; and (2) a path that the driver should take to affect the lane change. In some embodiments, the lane change timing system also helps the driver to avoid a collision.

Although the embodiments of the lane change timing system are discussed here in relation to lane changing, the functionality provided by the lane change timing system can be extended to other driving scenarios such as merging according to other embodiments.

Existing solutions are now described. A first existing solution includes a lane change assistant that works by using two mid-range radar sensors that are concealed in the rear bumper. Whenever another vehicle approaches at speed from behind or is already present in the blind spot, a signal such as a warning light in the side mirror alerts the driver to the hazard. Should the driver still activate the turn signal with the intention of changing lanes, the system issues an additional acoustic or haptic warning. However, the first existing solution only considers how to deliver warning signal when it is unsafe to change the lane such as acoustic and haptic warning. Accordingly, the first existing solution is inadequate to solve the problem solved by the embodiments of the lane change timing system described herein because it does not provide the driver with timing information that informs the driver about the optimum time to change lanes; by comparison, the embodiments of the lane change timing system described herein are operable to provide the driver with timing information that informs the driver about the optimum time to change lanes. The first existing solution also does not determine an optimum time to change lanes; by comparison, the embodiments of the lane change timing system described herein are operable to determine an optimum time to change lanes. The first existing solution also does not determine a path that a driver should take in order to change lanes or provide the driver with visual information that informs the driver of the path that they should take in order to change lanes; by comparison, the embodiments of the lane change timing system described herein are operable to determine a path that a driver should take in order to change lanes or provide the driver with visual information that informs the driver of the path that they should take in order to change lanes.

A second existing solution is a Lane Change Aid (LCA) system where the driver of a vehicle traveling along a highway is warned if any unsafe lane change or merge maneuver is attempted, regardless of information available through the vehicle's rearview mirror system. The second existing solution focuses on giving a warning signal to avoid the collision from the oncoming vehicle. The second existing solution is inadequate to solve the problem solved by the embodiments of the lane change timing system described herein because the second existing solution does not provide the driver with timing information that informs the driver about the optimum time to change lanes. The second existing solution also does not determine an optimum time to change lanes. The second existing solution also does not determine a path that a driver should take in order to change lanes or provide the driver with visual information that informs the driver of the path that they should take in order to change lanes.

A third existing solution includes a lane change assist system that works when a difference between the host vehicle and other vehicles on an adjacent target lane is small. The third existing solution determines a period of a lane change assist and sets a target speed range for the vehicle so that automatic lane change can be performed. The third existing solution is limited to automated vehicles which are likely Level 3 or higher. By contrast, the lane change timing system described herein operates in non-autonomous vehicles that are manually operated (i.e., a "manual vehicle"), or autonomous vehicles that are Level 3 or lower. Additionally, the third existing solution is inadequate to solve the problem solved by the embodiments of the lane change timing system because: (1) it does not provide the driver with timing information that informs the driver about the optimum time to change lanes; and (2) it does not disclose functionality that would be necessary to operate with a manual vehicle where the emphasis is on informing a driver about how to best manage roadway scenarios. The third existing solution also does not calculate an optimum time to change lanes as done by our invention. This existing solution also does not determine a path that a driver should take in order to change lanes or provide the driver with visual information that informs the driver of the path that they should take in order to change lanes.

A fourth existing solution is referred to as "Auto Lane Change" technology. Auto Lane Change technology is unable to determine whether a lane is safe or appropriate when a driver wants to change lanes because Auto Lane Change technology cannot detect oncoming traffic in a target lane (i.e., a second lane which is entered when changing lanes from a first lane to the second lane); by comparison, the embodiments of the lane change timing system described herein are operable to detect oncoming traffic in a target lane using V2X communication with other perimeter vehicles or RSUs. Auto Lane Change technology also is not able to determine whether it is safe or appropriate for a driver to change lanes; by comparison, the embodiments of the lane change timing system described herein are operable to determine whether it is safe or appropriate for a driver to change lanes. Auto Lane Change technology is also not able to assist a driver to know whether it is safe and appropriate to change lanes; by comparison, the embodiments of the lane change timing system described herein are operable to assist a driver to know whether it is safe and appropriate to change lanes. Auto Lane Change technology also does not generate graphics which provide drivers with visual information indicating whether it is safe to change lanes; by comparison, the embodiments of the lane change timing system described herein are operable to provide drivers with visual information indicating whether it is safe to change lanes.

Figure 1B:
FIG. 1B is a block diagram illustrating graphics provided by the lane change timing system on a HUD according to some embodiments.
Figure 1C:
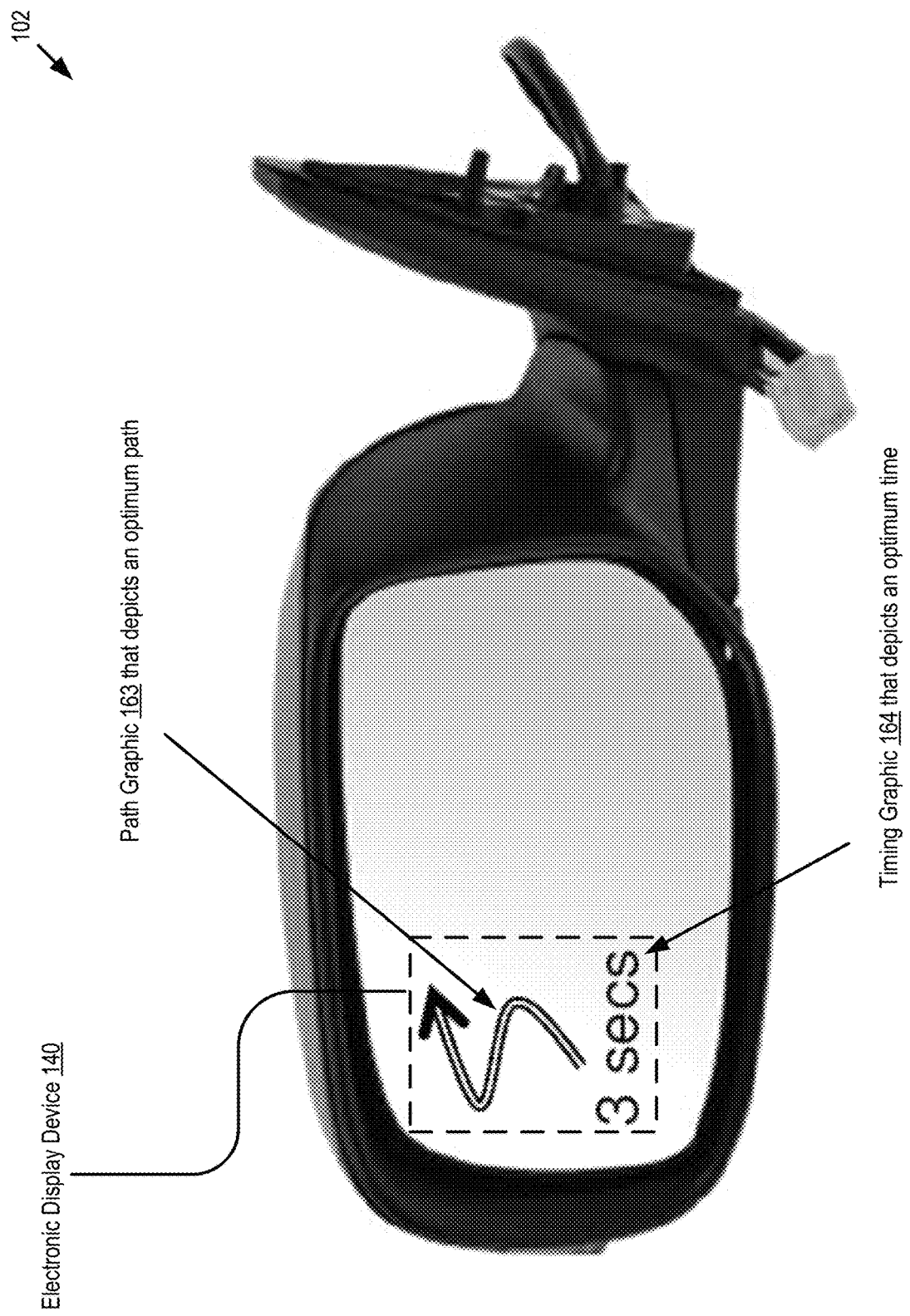
FIG. 1C is a block diagram illustrating graphics provided by the lane change timing system on an electronic display of a side mirror according to some embodiments.

Referring to FIG. 1A, depicted is an operating environment 100 for a lane change timing system 199 according to some embodiments. As depicted, the operating environment 100 includes the following elements: an ego vehicle 123; a first perimeter vehicle 124; an Nth perimeter vehicle 128 (where "N" is a positive whole number greater than one and indicates that the operating environment 100 include any positive whole number of infrastructure devices); and an infrastructure device 122. These elements are communicatively coupled to one another by a network 105.

Although one ego vehicle 123, one infrastructure device 122, and one network 105 are depicted in FIG. 1A, in practice the operating environment 100 may include one or more ego vehicles 123, one or more infrastructure devices 122, and one or more networks 105. FIG. 1A depicts N perimeter vehicles 124 . . . 128, but in practice the operating environment 100 may include only the first perimeter vehicle 124.

The ego vehicle 123, the first perimeter vehicle 124 and the Nth perimeter vehicle 128 are connected vehicles. For example, each of the ego vehicle 123, the first perimeter vehicle 124 and the Nth perimeter vehicle 128 include a communication unit 145A, 145B, 145N and are therefore each a connected vehicle that is operable to send and receive electronic messages via the network 105.

The following devices provide similar functionality, include similar components and are referred to collectively or individually as the "communication unit 145": the communication unit 145A of the ego vehicle 123; the communication unit 145B of the first perimeter vehicle 124; the communication unit 145C of the infrastructure device 122; and a communication unit 145N of the Nth perimeter vehicle 128.

The following devices provide similar functionality, include similar components, and are referred to collectively or individually as the "V2X radio 146": the V2X radio 146A of the ego vehicle 123; the V2X radio 146B of the first perimeter vehicle 124; a V2X radio 146C of the infrastructure device 122; and a V2X radio 146N of the Nth perimeter vehicle 128.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2V, LTE-V2I, LTE-V2X, LTE-D2D, 5G-V2X, ITS-G5, ITS-Connect, VoLTE or any other mobile data network or combination of mobile data networks. Further, the network 105 may include one or more IEEE 802.11 wireless networks.

The following are endpoints of the network 105: the ego vehicle 123; the first perimeter vehicle 124; the infrastructure device 122; and the Nth perimeter vehicle 128. In some embodiments, the ego vehicle 123, the first perimeter vehicle 124 and the Nth perimeter vehicle 128 include an instance of the lane change timing system 199. The ego vehicle 123, the first perimeter vehicle 124 and the Nth perimeter vehicle 128 may be referred to collectively or individually as a "vehicular endpoint" or the "vehicular endpoints." In some embodiments, the vehicular endpoints may relay V2X messages to one another using the infrastructure device 122 or one another. For example, if the Nth perimeter vehicle 128 is outside of V2V transmission range of the ego vehicle 123, then the Nth perimeter vehicle 128 relays a V2X message to the ego vehicle 123 via one or more of the first perimeter vehicle 124 and the infrastructure device 122.

The ego vehicle 123 is any type of connected vehicle. For example, the ego vehicle 123 is one of the following types of vehicles that includes a communication unit 145: a car; a truck; a sports utility vehicle; a bus; a semi-truck; a robotic car; a drone or any other roadway-based conveyance. In some embodiments, the ego vehicle 123 is a DSRC-equipped vehicle.

In some embodiments, the ego vehicle 123 is an autonomous vehicle or a semi-autonomous vehicle. For example, the ego vehicle 123 includes a set of Advanced Driver Assistance Systems 180 (a set of ADAS systems 180) which provide autonomous features to the ego vehicle 123 which are sufficient to render the ego vehicle 123 an autonomous vehicle. The set of ADAS systems 180 includes one or more ADAS systems.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower level number. The different levels of autonomous vehicles are described briefly below.

Level 0: The set of ADAS systems 180 installed in a vehicle have no vehicle control. The set of ADAS systems 180 may issue warnings to the driver of the vehicle. A vehicle which is Level 0 is not an autonomous or semi-autonomous vehicle.

Level 1: The driver must be ready to take driving control of the autonomous vehicle at any time. The set of ADAS systems 180 installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the set of ADAS systems 180 installed in the autonomous vehicle fail to respond properly (based on the driver's subjective judgement). The set of ADAS systems 180 installed in the autonomous vehicle executes accelerating, braking, and steering. The set of ADAS systems 180 installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The set of ADAS systems 180 installed in the autonomous vehicle can control the autonomous vehicle in all but a few environments such as severe weather. The driver must enable the automated system (which is comprised of the set of ADAS systems 180 installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The set of ADAS systems 180 includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, the ego vehicle 123 includes the following elements: the set of ADAS systems 180; an onboard unit 126; a processor 125; a memory 127; a communication unit 145; a DSRC-compliant GPS unit 150; a sensor set 184; an electronic display device 140; a turning signal system 188; and a lane change timing system 199. These elements of the ego vehicle 123 are communicatively coupled to one another via a bus 120.

The set of ADAS systems 180 was described above, and so, that description will not be repeated here.

In some embodiments, the processor 125 and the memory 127 may be elements of an onboard vehicle computer system. The onboard vehicle computer system may be operable to cause or control the operation of the lane change timing system 199 of the ego vehicle 123. The onboard vehicle computer system may be operable to access and execute the data stored on the memory 127 to provide the functionality described herein for the lane change timing system 199 of the ego vehicle 123 or its elements. The onboard vehicle computer system may be operable to execute the lane change timing system 199 which causes the onboard vehicle computer system to execute one or more steps of one or more of the method 300 described below with reference to FIG. 3 and the method 800 described below with reference to FIG. 8. The onboard vehicle computer system may be operable to execute the lane change timing system 199 which causes the onboard vehicle computer system to execute one or more steps of the method 800 described below with reference to FIG. 8.

In some embodiments, the processor 125 and the memory 127 may be elements of the onboard unit 126. The onboard unit 126 includes an ECU or an onboard vehicle computer system that may be operable to cause or control the operation of the lane change timing system 199. In some embodiments, the onboard unit 126 is operable to access and execute the data stored on the memory 127 to provide the functionality described herein for the lane change timing system 199 or its elements. The onboard unit 126 may be operable to execute the lane change timing system 199 which causes the onboard unit 126 to execute one or more steps of one or more of the method 300 described below with reference to FIG. 3 and the method 800 described below with reference to FIG. 8.

In some embodiments, the DSRC-compliant GPS unit 150 includes any hardware and software necessary to make the ego vehicle 123 or the DSRC-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the DSRC-compliant GPS unit 150 is operable to provide GPS data 192 describing the location of the ego vehicle 123 with lane-level accuracy. For example, the ego vehicle 123 is traveling in a lane of a roadway. Lane-level accuracy means that the location of the ego vehicle 123 is described by the GPS data 192 so accurately that the ego vehicle's 123 lane of travel within the roadway may be accurately determined based on the GPS data 192 for this ego vehicle 123 as provided by the DSRC-compliant GPS unit 150. In some embodiments, the GPS data 192 is an element of the BSM data that is transmitted by the communication unit 145A as an element of a BSM.

In some embodiments, the DSRC-compliant GPS unit 150 includes hardware that wirelessly communicates with a GPS satellite to retrieve GPS data 192. The GPS data 192 is digital data that describes the geographic location of the ego vehicle 123 with a precision that is compliant with the DSRC standard. The DSRC standard requires that GPS data 192 be precise enough to infer if two vehicles (one of which is, for example, the ego vehicle 123) are located in adjacent lanes of travel. In some embodiments, the DSRC-compliant GPS unit 150 is operable to identify, monitor and track its two-dimensional position within 1.5 meters of its actual position 68% of the time under an open sky. Since driving lanes are typically no less than 3 meters wide, whenever the two-dimensional error of the GPS data 192 is less than 1.5 meters the lane change timing system 199 described herein may analyze the GPS data 192 provided by the DSRC-compliant GPS unit 150 and determine what lane the ego vehicle 123 is traveling in based on the relative positions of two or more different vehicles (one of which is, for example, the ego vehicle 123) traveling on the roadway at the same time.

By comparison to the DSRC-compliant GPS unit 150, a conventional GPS unit which is not compliant with the DSRC standard is unable to determine the location of an ego vehicle 123 with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to identify a lane of travel for an ego vehicle 123 based on GPS data 192 alone; instead, systems having only conventional GPS units must utilize sensors such as cameras to identify the ego vehicle's 123 lane of travel. Identifying a lane of travel of a vehicle is beneficial, for example, because it helps the lane change timing system 199 to more accurately identify the ego vehicle's current lane of travel relative to the lanes of travel of other vehicles in a target lane for a lane change by the ego vehicle; this is beneficial because it helps the lane change timing system 199 to avoid collisions with these other vehicles by the ego vehicle 123 when changing lanes.

In some embodiments, the ego vehicle 123 may include a sensor set 184. The sensor set 184 includes one or more sensors that are operable to measure the physical environment outside of the ego vehicle 123. For example, the sensor set 184 may include one or more sensors that record one or more physical characteristics of the physical environment that is proximate to the ego vehicle 123. The memory 127 may store sensor data 191. The sensor data 191 is digital data that describes the one or more physical characteristics recorded by the one or more sensors of the sensor set 184.

In some embodiments, the sensor data 191 includes the BSM data 197. In some embodiments, the BSM data 197 is generated using some or all of the sensor measurements recorded by the sensor set 184 and described by the sensor data 191. Example embodiments of the BSM data 197 are depicted in FIGS. 4 and 5.

In some embodiments, the sensor set 184 includes any sensors which are necessary to record the sensor data 191 which is included in the BSM data 197 depicted in FIGS. 4 and 5. For example, the sensor set 184 includes a speedometer, compass, the DSRC-compliant GPS unit 150, sensors which describe the operation of vehicle ADAS systems, accelerometers and any other sensors which are necessary to record the GPS data 192, heading data, velocity data, vehicle motion data, vehicle size data, path history data and other elements of the BSM data 197 as depicted in FIGS. 4 and 5. The heading data, velocity data, vehicle motion data, vehicle size data and path history data are defined in FIGS. 4 and 5, and so, those descriptions will not be repeated here.

In some embodiments, if the sensor set 184 is present in a perimeter vehicle (e.g., the first perimeter vehicle 124 and the Nth perimeter vehicle 128), then the sensor set 184 records BSM data 197 that describes one or more of the following for the perimeter vehicle: the GPS data 192; the heading data; the velocity data; the vehicle motion data; the vehicle size data; the path history data; and other elements of the BSM data 197 as depicted in FIGS. 4 and 5. If the sensor set 184 is present in the ego vehicle 123, then the sensor set 184 records sensor data 191 that describes one or more of the following for the ego vehicle: the GPS data 192; the heading data; the velocity data; the vehicle motion data; the vehicle size data; the path history data; and other elements of the BSM data 197 as depicted in FIGS. 4 and 5.

In some embodiments, the sensor data 191 includes digital data that describes measurements for the location, velocity, heading and path history of one or more perimeter vehicles. In some embodiments, the sensor data 191 includes digital data that describes measurements for the location, velocity, heading and path history of the ego vehicle. In some embodiments, the sensor data 191 includes digital data that describes measurements for the location, velocity, heading and path history of the ego vehicle and one or more perimeter vehicles. In some embodiments, the location, velocity, heading and path history information about the one or more perimeter vehicles is received via one or more BSMs, and described by the BSM data 197, so that the sensor set 184 does not need to record the sensor data 191 describing the information about the one or more perimeter vehicles. In some embodiments, the sensor set 184 records the sensor data 191 describing the information about the one or more perimeter vehicles and uses this information to verify the accuracy of the location, velocity, heading and path history information about the one or more perimeter vehicles that is received via one or more BSMs and described by the BSM data 197 included in these one or more BSMs.

In some embodiments, the sensor set 184 includes any sensors which are necessary to record the sensor data 191.

In some embodiments, the sensor set 184 of the ego vehicle 123 may include one or more of the following vehicle sensors: a clock; a network traffic sniffer; a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. In some embodiments, the DSRC-compliant GPS unit 150 is an element of the sensor set 184.

The communication unit 145 transmits and receives data to and from a network 105 or to another communication channel. In some embodiments, the communication unit 145 may include a DSRC transceiver, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio 146A. The V2X radio 146A is a hardware unit that includes a transmitter and a receiver that is operable to send and receive wireless messages via any V2X protocol. For example, the V2X radio 146A includes any hardware and software that is necessary to send and receive one or more of the following types of V2X message: DSRC; LTE; millimeter wave communication; 3G; 4G; 5G; LTE-V2X; LTE-V2V; LTE-D2D; 5G-V2X; ITS-G5; ITS-Connect; VoLTE; and any derivative or fork of one or more of the V2X communication protocols listed here.

In some embodiments, the V2X radio 146A is a multi-channel V2X radio that includes a plurality of channels. In some embodiments, some of the channels are operable to send and receive V2X messages via a first V2X protocol whereas some of the channels are operable to send and receive V2X messages via an Nth V2X protocol.

In some embodiments, the V2X radio 146A is a DSRC radio. For example, the V2X radio 146A is operable to send and receive wireless messages via DSRC. The V2X transmitter is operable to transmit and broadcast DSRC messages over the 5.9 GHz band. The V2X receiver is operable to receive DSRC messages over the 5.9 GHz band. The V2X radio includes seven channels (e.g., DSRC channel numbers 172, 174, 176, 178, 180, 182 and 184) with at least one of these channels reserved for sending and receiving BSMs (e.g., DSRC channel number 172 is reserved for BSMs). In some embodiments, at least one of these channels is reserved for sending and receiving Pedestrian Safety Messages ("PSM" if singular, or "PSMs" if plural) as described in U.S. patent application Ser. No. 15/796,296 filed on Oct. 27, 2017 and entitled "PSM Message-based Device Discovery for a Vehicular Mesh Network," the entirety of which is hereby incorporated by reference. In some embodiments, DSRC channel number 172 is reserved for sending and receiving PSMs.

In some embodiments, the V2X radio 146A includes a non-transitory memory which stores digital data that controls the frequency for broadcasting BSMs. In some embodiments, the non-transitory memory stores a buffered version of the GPS data 192 for the ego vehicle 123 so that the GPS data 192 for the ego vehicle 123 is broadcast as an element of the BSMs which are regularly broadcast by the V2X radio 146A. BSMs may be broadcast by the V2X radio 146A over various V2X protocols, and not just DSRC.

In some embodiments, the V2X radio 146A includes any hardware or software which is necessary to make the ego vehicle 123 compliant with the DSRC standards. In some embodiments, the DSRC-compliant GPS unit 150 is an element of the V2X radio 146A.

In the depicted embodiment, the endpoints depicted in FIG. 1A include a communication unit such as the communication unit 145A of the ego vehicle 123 (e.g., the communication units 145B, 145C . . . 145N) and these communication units are referred to collectively or individually as the "communication unit 145." In the depicted embodiment, the communication units 145 include a V2X radio such as the V2X radio 146A of the ego vehicle 123 (e.g., the V2X radios 146B, 146C . . . 146N) and these V2X radios are referred to collectively or individually as the "V2X radio 146."

Figure 6:
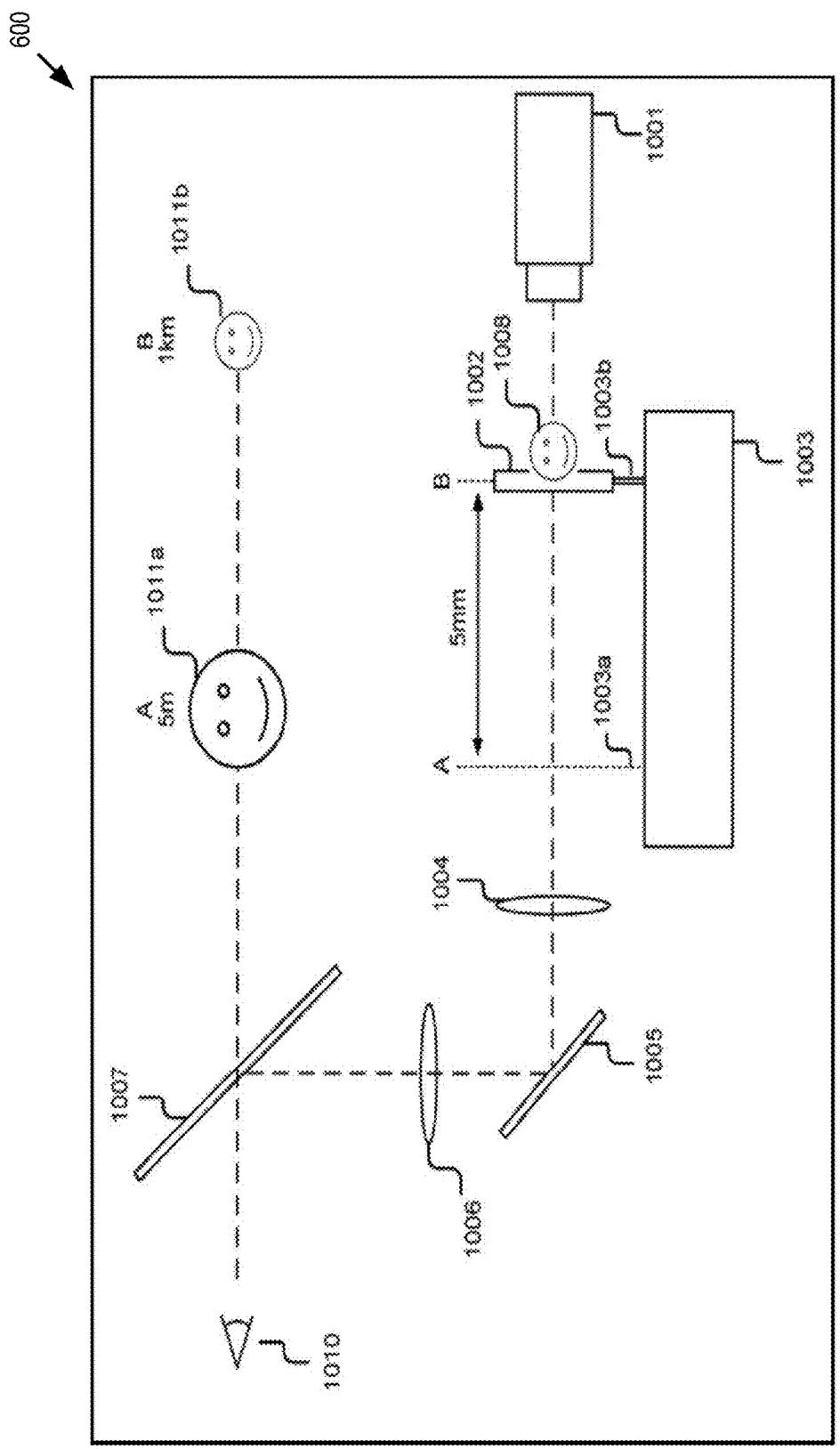
FIG. 6 is a block diagram of a 3D-HUD according to some embodiments.

The electronic display device 140 includes any type of electronic display device including, for example, one or more of the following: a HUD of the ego vehicle 123; an electronic display installed in a side mirror of the ego vehicle 123; an augmented reality (AR) display or viewing device of the ego vehicle 123; a head unit of the ego vehicle 123; and a dash meter display of the ego vehicle 123. FIGS. 1B and 6 depict examples of a suitable HUD according to some embodiments. FIG. 1C depicts an example of a suitable electronic display installed in a side mirror of the ego vehicle 123. Another example of a suitable HUD and AR viewing device is described in U.S. patent application Ser. No. 15/603,086 filed on May 23, 2017 and entitled "Providing Traffic Mirror Content to a Driver," the entirety of which is hereby incorporated by reference. Yet another example of a suitable HUD and AR viewing device is described in U.S. patent application Ser. No. 15/591,100 filed on May 9, 2017 and entitled "Augmented Reality for Vehicle Lane Guidance," the entirety of which is hereby incorporated by reference.

The processor 125 includes an arithmetic logic unit, a microprocessor, a general-purpose controller, or some other processor array to perform computations and provide electronic display signals to the electronic display device 140. The processor 125 processes data signals and may include various computing architectures including a complex instruction set computer (CISC) architecture, a reduced instruction set computer (RISC) architecture, or an architecture implementing a combination of instruction sets. The ego vehicle 123 may include one or more processors 125. Other processors, operating systems, sensors, displays, and physical configurations may be possible.

The turning signal system 188 is a conventional turning signal system of a vehicle such as the ego vehicle 123. In some embodiments, the turning signal system 188 includes a lever located inside the cabin of the ego vehicle 123. The lever is configured to be moved up and down, which causes turning lights on the left or right posterior of the ego vehicle 123 to flash (i.e., be "activated") so long as the ego vehicle 123 is presently operational (e.g., the ego vehicle's ignition was successfully engaged [if powered by a combustion engine] or the ego vehicle's power button is turned on [if powered by an all-electric drive train]). The lever is electronically coupled to the turning lights, which are sometimes referred to as "turning signals" or "blinkers," and operable to control the operation of the turning lights. In this way the lever is operable to activate a turning light of the ego vehicle 123 or deactivate a turning light of the ego vehicle 123.

In some embodiments, a turning light which is activated flashes, whereas a turning light that is not activated is not illuminated.

In some embodiments, the lever is a three-position lever that includes a top position, a middle position, and a bottom position. The turning signal system 188 includes two turning lights, one on the left side of the posterior of the ego vehicle 123 (i.e., the driver side of the ego vehicle 123) and one on the right side of the posterior of the ego vehicle 123 (i.e., the passenger side of the ego vehicle 123). Placing the lever in the top position causes either the left or right turning light to flash, whereas placing the lever in the bottom position causes the remaining turning light to flash. Placing the lever in the middle position results in neither the left nor the right turning light flashing.

The memory 127 is a non-transitory memory that stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The ego vehicle 123 may include one or more memories 127.

The memory 127 of the ego vehicle 123 stores one or more of the following types of digital data: the sensor data 191; the BSM data 197; timing data 189; graphical data 193; preference data 194; the GPS data 192; and the path data 196.

The sensor data 191 and the BSM data 197 are described above and also below with reference to FIGS. 4 and 5, and so, those descriptions will not be repeated here. In some embodiments, the BSM data 197 may be received as a payload for a BSM that is received from the infrastructure device 122, the first perimeter vehicle 124 or the Nth perimeter vehicle 128. For example, in some embodiments the BSM data 197 includes GPS data 192 describing a geographical location of one or more of the first perimeter vehicle 124 and the Nth perimeter vehicle 128. This BSM data 197 may be relayed to the ego vehicle 123 from one or more of the endpoints of the network 105. In some embodiments, the GPS data 192 included in the BSM data 197 describes the geographic location of one or more of the first perimeter vehicle 124 and the Nth perimeter vehicle 128 with lane-level accuracy. In some embodiments, the memory 127 of the ego vehicle 123 stores a plurality of instances of BSM data 197 so that the memory 127 stores the sensor measurements for a plurality of connected vehicle that are within DSRC transmission range of the ego vehicle 123. For example, each of the memory 127 of the ego vehicle 123 includes a plurality of instances of BSM data 197 for the first perimeter vehicle 124 . . . and the Nth perimeter vehicle 128 so that the memory 127 stores N instances of BSM data 197.

In some embodiments, the memory 127 stores DSRC data which is digital data received in a DSRC message or transmitted as a DSRC message. The DSRC data describes any information that is included in the BSM data 197. For example, a BSM message is a special type of DSRC message which is transmitted at a regular interval (e.g., once every 0.10 seconds), but the content or payload of a DSRC message (i.e., the DSRC data) is the same as that of a BSM message (i.e., the DSRC data for a DSRC message is the same as or similar to the BSM data for a BSM message).

In some embodiments, the memory 127 stores any of the data described herein. In some embodiments, the memory 127 stores any data that is necessary for the lane change timing system 199 to provide its functionality.

The sensor data 191 is digital data that describes the sensor measurements of the one or more sensors included in the sensor set 184.

The GPS data 192 is digital data that describes the geographic location of the ego vehicle 123. In some embodiments, the GPS data 192 describes the geographic location of the ego vehicle 123 with lane-level accuracy.

The timing data 189 is digital data that describes an optimum time to begin changing lanes by the ego vehicle 123 from a current lane of travel to the lane indicated by an activated turning light of the turning signal system 188 (either the lane to the left of the ego vehicle 123 of the lane to the right of the ego vehicle 123). In some embodiments, the timing data 189 is digital data that describes an optimum amount of time that a driver 103 of the ego vehicle 123 should wait before beginning to transfer from the current lane of travel to the target lane of travel which is indicated by the activated turning light of the turning signal system 188. The driver 103 is a human operator of the ego vehicle 123.

In some embodiments, the timing data 189 describes timing semantics for executing a path for changing lanes from a current lane to a target lane. For example, in some embodiments, the timing data 189 describes one or more of the following: (1) an optimum time to begin changing lanes by the ego vehicle 123 from a current lane of travel to the lane indicated by an activated turning light of the turning signal system 188; and (2) an optimum time to complete changing lanes by the ego vehicle from the current lane of travel to the lane indicated by the activated turning light of the turning signal system 188. In some embodiments, whether the timing graphic displays the optimum time to begin changing lanes or the optimum time to complete changing lanes is configurable by the driver of the ego vehicle 123.

In some embodiments, the lane change timing system 199 includes code and routines that are operable, when executed the processor 125 or the onboard unit 126, to cause the processor 125 or the onboard unit 126 to analyze BSM data 197 describing the behavior of one or more perimeter vehicles, as well as the state of the ego vehicle 123 as described by the sensor data 191 collected by the sensor set 184 of the ego vehicle 123, to determine timing data 189 describing an optimum time for the driver 103 of the ego vehicle 123 to start changing lanes in the direction indicated by the activated turning light of the turning signal system 188.

In some embodiments, the lane change timing system 199 includes code and routines that are operable to analyze the sensor data 191 included in one or more instances of BSM data 197 for two or more vehicles (e.g., two or more of the ego vehicle 123, the first perimeter vehicle 124 . . . and the Nth perimeter vehicle 128) to determine the timing data 189. For example, the lane change timing system 199 considers one or more of the following to determine an optimum time for the driver 103 of the ego vehicle 123 to start changing lanes in the direction indicated by the activated turning light of the turning signal system 188: the relative positions of the ego vehicle 123 and one or more perimeter vehicles; the relative velocities of the ego vehicle 123 and one or more perimeter vehicles; the relative headings of the ego vehicle 123 and one or more perimeter vehicles; and the relative path histories of the ego vehicle 123 and the one or more perimeter vehicles.

The path data 196 is digital data describing a path that the driver 103 of the ego vehicle 123 should take to complete the lane change indicated by the activated turning light of the turning signal system 188. In some embodiments, the lane change timing system 199 includes code and routines that are operable, when executed the processor 125 or the onboard unit 126, to cause the processor 125 or the onboard unit 126 to analyze BSM data 197 describing the behavior of one or more perimeter vehicles, as well as the state of the ego vehicle 123 as described by the sensor data 191 collected by the sensor set 184 of the ego vehicle 123, to determine path data 196 describing the path that the driver 103 of the ego vehicle 123 should take to complete the lane change indicated by the activated turning light of the turning signal system 188.

In some embodiments, the lane change timing system 199 includes code and routines that are operable to analyze the sensor data 191 included in one or more instances of BSM data 197 for two or more vehicles (e.g., two or more of the ego vehicle 123, the first perimeter vehicle 124 . . . and the Nth perimeter vehicle 128) to determine the path data 196. For example, the lane change timing system 199 considers one or more of the following to determine the path that the driver 103 of the ego vehicle 123 should take to complete the lane change indicated by the activated turning light of the turning signal system 188: the relative positions of the ego vehicle 123 and one or more perimeter vehicles; the relative velocities of the ego vehicle 123 and one or more perimeter vehicles; the relative headings of the ego vehicle 123 and one or more perimeter vehicles; and the relative path histories of the ego vehicle 123 and the one or more perimeter vehicles.

The graphical data 193 is digital that is operable to cause the electronic display device 140 to display one or more graphics that describe the optimum time described by the timing data 189 and the path described by the path data 196. An example of graphics generated based on the graphical data 193 is depicted in FIGS. 1B and 1C according to some embodiments.

The preference data 194 is digital data that describes a preference of the driver 103 for whether the graphics that describe the optimum time and the path are displayed by a HUD or an electronic display of a side view mirror of the ego vehicle 123.

Figure 3:
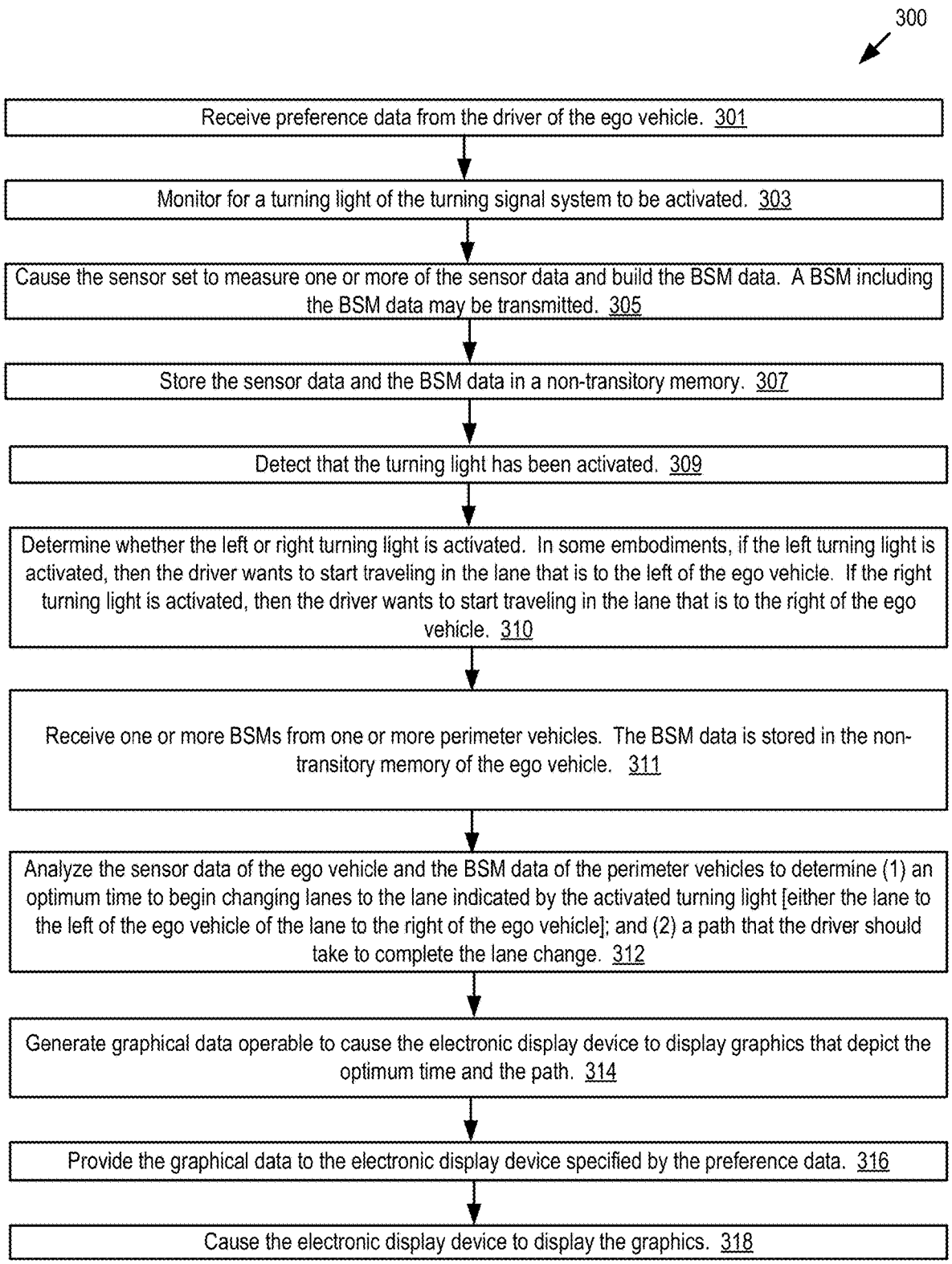
FIG. 3 depicts a method for providing lane change timing assistance for a connected vehicle according to some embodiments.

In some embodiments, the lane change timing system 199 includes software that is operable, when executed by the processor 125, to cause the processor 125 to execute one or more the steps of the method 300 depicted in FIG. 3. In some embodiments, the lane change timing system 199 includes software that is operable, when executed by the processor 125, to cause the processor 125 to execute one or more the steps of the method 800 depicted in FIG. 8.

In some embodiments, the lane change timing system 199 includes software installed in the onboard unit 126 of the ego vehicle 123 that is operable, when executed by the onboard unit 126, to cause the onboard unit 126 to execute one or more of the following steps: monitoring for a turning light of the turning signal system 188 to be activated; detecting that a turning light has been activated; determining whether the left or right turning light is activated; analyzing one or more of the sensor data 191 and the BSM data 197 to determine (a) an optimum time to begin changing lanes to the lane indicated by the activated turning light [either the lane to the left of the ego vehicle 123 of the lane to the right of the ego vehicle 123]; and (b) a path that the driver 103 should take to complete the lane change; generating graphical data 193 that is operable to cause the electronic display device 140 to display one or more graphics that depict the optimum time and the path; providing the graphical data 193 to the electronic display device 140; and causing the electronic display device 140 to display the one or more graphics. In some embodiments, the graphics are displayed in accordance with the preference data 194.

In some embodiments, the lane change timing system 199 is implemented using hardware including a field-programmable gate array ("FPGA") or an application-specific integrated circuit ("ASIC"). In some other embodiments, the lane change timing system 199 is implemented using a combination of hardware and software.

The first perimeter vehicle 124 includes elements similar to the ego vehicle 123, and so, those descriptions will not be repeated here. For example, the first perimeter vehicle 124 includes one or more of the following elements: a lane change timing system 199; a sensor set 184; a non-transitory memory that stores BSM data 197 that includes the sensor data recorded by the sensor set 184; and a communication unit 145 including a V2X radio 146. The lane change timing system 199 of the first perimeter vehicle 124 provides the same functionality as the lane change timing system 199 of the ego vehicle 123, and so that description will not be repeated here. The communication unit 145 and the V2X radio 146 of the first perimeter vehicle 124 provide the same functionality as the communication unit 145 and the V2X radio 146 of the ego vehicle 123, and so, those descriptions will not be repeated here.

Although not depicted in FIG. 1A, in some embodiments the first perimeter vehicle 124 includes one or more of the elements of the ego vehicle 123. For example, the first perimeter vehicle 124 includes one or more of the following: an onboard unit 126; a processor 125; a memory 127; a set of ADAS systems 180; a DSRC-compliant GPS unit 150; and an electronic display device 140.

The lane change timing system 199 of the first perimeter vehicle 124 provides the same functionality to the first perimeter vehicle 124 as the lane change timing system 199 of the ego vehicle 123 provides to the ego vehicle 123.

As depicted in FIG. 1A, the first perimeter vehicle 124 includes a detection module 198. In some embodiments the detection module 198 is software installed in an onboard unit of the first perimeter vehicle 124 that controls the operation of the sensor set 184 of the first perimeter vehicle 124 to cause the sensor set 184 to generate sensor data (such as the sensor data 191) and, from this sensor data, build instances of BSM data 197. In some embodiments, the detection module 198 is an element of the V2X radio 146 of the first perimeter vehicle 124 (as well as the V2X radios 146 of the other endpoints of the network 105). For example, the V2X radio 146 is a DSRC radio as this sensor data is routinely generated, and this BSM data 197 is routinely built using the sensor data, pursuant to the DSRC protocol. For this reason, the detection module 198 is also present in the ego vehicle 123 and the Nth perimeter vehicle 128 in some embodiments. In some embodiments, the detection module 198 is an element of the lane change timing system 199.

The infrastructure device 122 includes a RSU or some other processor-based computing device that includes a communication unit 145 and a non-transitory memory that is operable to store digital data such as the BSM data 197. In some embodiments, the infrastructure device 122 is a DSRC-equipped device. The infrastructure device 122 is operable, for example, to receive V2X messages and relay these messages to other connected devices such as the ego vehicle 123, the first perimeter vehicle 124 and the Nth perimeter vehicle 128. In this way, the infrastructure device 122 may relay a V2X message to an endpoint that would otherwise be outside of transmission range of an endpoint that transmitted the V2X message. In some embodiments, the infrastructure device 122 relays BSMs among the endpoints of the network 105.

The Nth perimeter vehicle 128 includes elements similar to the ego vehicle 123 and the first perimeter vehicle 124, and so, those descriptions will not be repeated here. For example, the Nth perimeter vehicle 128 includes one or more of the following elements: a lane change timing system 199; a sensor set 184; a non-transitory memory that stores BSM data 197 that includes the sensor data recorded by the sensor set 184; a communication unit 145 including a V2X radio 146; and a detection module 198. The lane change timing system 199 of the Nth perimeter vehicle 128 provides the same functionality as the lane change timing system 199 of the ego vehicle 123, and so that description will not be repeated here. The communication unit 145 and the V2X radio 146 of the first perimeter vehicle 124 provide the same functionality as the communication unit 145 and the V2X radio 146 of the ego vehicle 123, and so, those descriptions will not be repeated here.

Although not depicted in FIG. 1A, in some embodiments the Nth perimeter vehicle 128 includes one or more of the elements of the ego vehicle 123. For example, Nth first perimeter vehicle 128 includes one or more of the following: an onboard unit 126; a processor 125; a memory 127; a set of ADAS systems 180; a DSRC-compliant GPS unit 150; and an electronic display device 140.

The lane change timing system 199 of the first perimeter vehicle 124 provides the same functionality to the Nth perimeter vehicle 128 as the lane change timing system 199 of the ego vehicle 123 provides to the ego vehicle 123.

Referring now to FIG. 1B, depicted is a block diagram 101 illustrating graphics provided by the lane change timing system on a HUD according to some embodiments. In the depicted embodiment the electronic display device 140 is a HUD. The electronic display device 140 depicts a path graphic 161 and a timing graphic 162. The path graphic 161 depicts the path that the driver 103 of the ego vehicle 123 should take in order to travel into the adjacent lane which is on the driver side of the ego vehicle 123. The timing graphic 162 indicates that the driver 103 of the ego vehicle 123 should start to change lanes within the next three seconds. Accordingly, if the driver 103 of the ego vehicle 123 waits more than three seconds from the point in time depicted in FIG. 1B, then it will be too late for the driver 103 to safely change lanes as desired.

In some embodiments, the path graphic 161 depicts a path that includes instructions to move from a current lane to a target lane. In some embodiments, the instructions are graphical instructions.

In some embodiments, the timing graphic 162 is updated by the lane change timing system 199 to count down the time remaining for the driver 103 to safely change lanes (or complete the lane change). For example, one second after the moment in time depicted in FIG. 1B the timing graphic 162 indicates that the driver has two seconds to change lanes (or some other predetermined time interval). In some embodiments, the lane change timing system 199 includes a voice interface that provides audible feedback to a driver of the ego vehicle 123 (e.g., via an onboard speaker system of the ego vehicle 123) that counts down the time remaining for the driver 103 to safely change lanes (or complete the lane change).

In some embodiments, one or more of the path graphic 161 and the timing graphic 162 are depicted in green color so long as it is safe for the driver 103 to change lanes but their color changes to red when it is no longer safe for the driver 103 to change lanes. In some embodiments, the color of one or more of the path graphic 161 and the timing graphic 162 is yellow when the driver has two or one seconds remaining to change lanes. In this example way, the driver 103 can understand the content of the timing graphic 162 using on their peripheral vision by perceiving the color of the graphics according to some embodiments.

In some embodiments, the timing graphic 162 depicts one or more of the following: (1) an optimum time to begin changing lanes by the ego vehicle 123 from a current lane of travel to the lane indicated by an activated turning light of the turning signal system 188; and (2) an optimum time to complete changing lanes by the ego vehicle from the current lane of travel to the lane indicated by the activated turning light of the turning signal system 188.

Referring now to FIG. 1C, depicted is a block diagram 102 illustrating graphics provided by the lane change timing system on an electronic display of a side mirror according to some embodiments. In the depicted embodiment, the electronic display device 140 is an electronic display of a side mirror of the ego vehicle 123. For example, the driver-side side mirror of the ego vehicle 123 includes an embedded electronic display device 140 as depicted in FIG. 1C. The electronic display device 140 depicts a path graphic 163 and a timing graphic 164. The path graphic 163 depicts the path that the driver 103 of the ego vehicle 123 should take in order to travel into the adjacent lane which is on the driver side of the ego vehicle 123. The timing graphic 164 indicates that the driver 103 of the ego vehicle 123 should start to change lanes within the next three seconds. Accordingly, if the driver 103 of the ego vehicle 123 waits more than three seconds from the point in time depicted in FIG. 1C, then it will be too late for the driver 103 to safely change lanes as desired.

In some embodiments, the path graphic 163 depicts a path that includes instructions to move from a current lane to a target lane. In some embodiments, the instructions are graphical instructions.

In some embodiments, the time depicted by the timing graphic 164 is more or less than three seconds.

In some embodiments, the timing graphic 164 is updated by the lane change timing system 199 to count down the time remaining for the driver 103 to safely change lanes. For example, one second after the moment in time depicted in FIG. 1C the timing graphic 164 indicates that the driver has two seconds to change lanes.

In some embodiments, one or more of the path graphic 163 and the timing graphic 164 are depicted in green color so long as it is safe for the driver 103 to change lanes but their color changes to red when it is no longer safe for the driver 103 to change lanes. In some embodiments, the color of one or more of the path graphic 163 and the timing graphic 164 is yellow when the driver has two or one seconds remaining to change lanes (or some other predetermined time interval).

Drivers sometimes struggle to know when it is safe to change lanes. For example, it can be hard to judge how fast perimeter vehicle are traveling in the target lane, and whether it is safe to attempt to change lanes. It can also be difficult for some drivers to discern a path to travel to complete the lane change. In some embodiments, the lane change timing indicator improves the performance of the ego vehicle by providing increased functionality to the ego vehicle that: determines an optimum time to change lanes and a path to travel to complete the lane change; and displays graphical information that informs the driver of the optimum time and the path. In some embodiments, the electronic displays that display the graphical information are situated in the ego vehicle so that they are in natural positions that a driver would look to when they are attempting to change lanes. For example, it is natural for a driver to look in the corner of their front windshield or their side view mirror when attempting to change lanes. In some embodiments, the lane change timing system is a new ADAS system that helps drivers to better judge when it is safe to change lanes. Our research indicates that the lane change timing system will help the driver and the ego vehicle avoid collisions because the lane change timing system improves the performance of the ego vehicle by informing the driver of the ego vehicle about the optimum time to change lanes and the path to travel when changing lanes.

In some embodiments, the timing graphic 164 depicts one or more of the following: (1) an optimum time to begin changing lanes by the ego vehicle 123 from a current lane of travel to the lane indicated by an activated turning light of the turning signal system 188; and (2) an optimum time to complete changing lanes by the ego vehicle from the current lane of travel to the lane indicated by the activated turning light of the turning signal system 188.

In some embodiments, the timing graphic describes different times for executing different portions of the path described by the path graphic. For example, the path includes multiple turns, and the timing graphic describes timing semantics for each of the turns of the path (e.g., the path includes a left turn followed by a right turn as is done by the path graphic 163, and the timing graphic 164 depicts a first optimum time for executing the left turn and then, after the left turn is executed, a second optimum time for executing the right turn).

Figure 2:
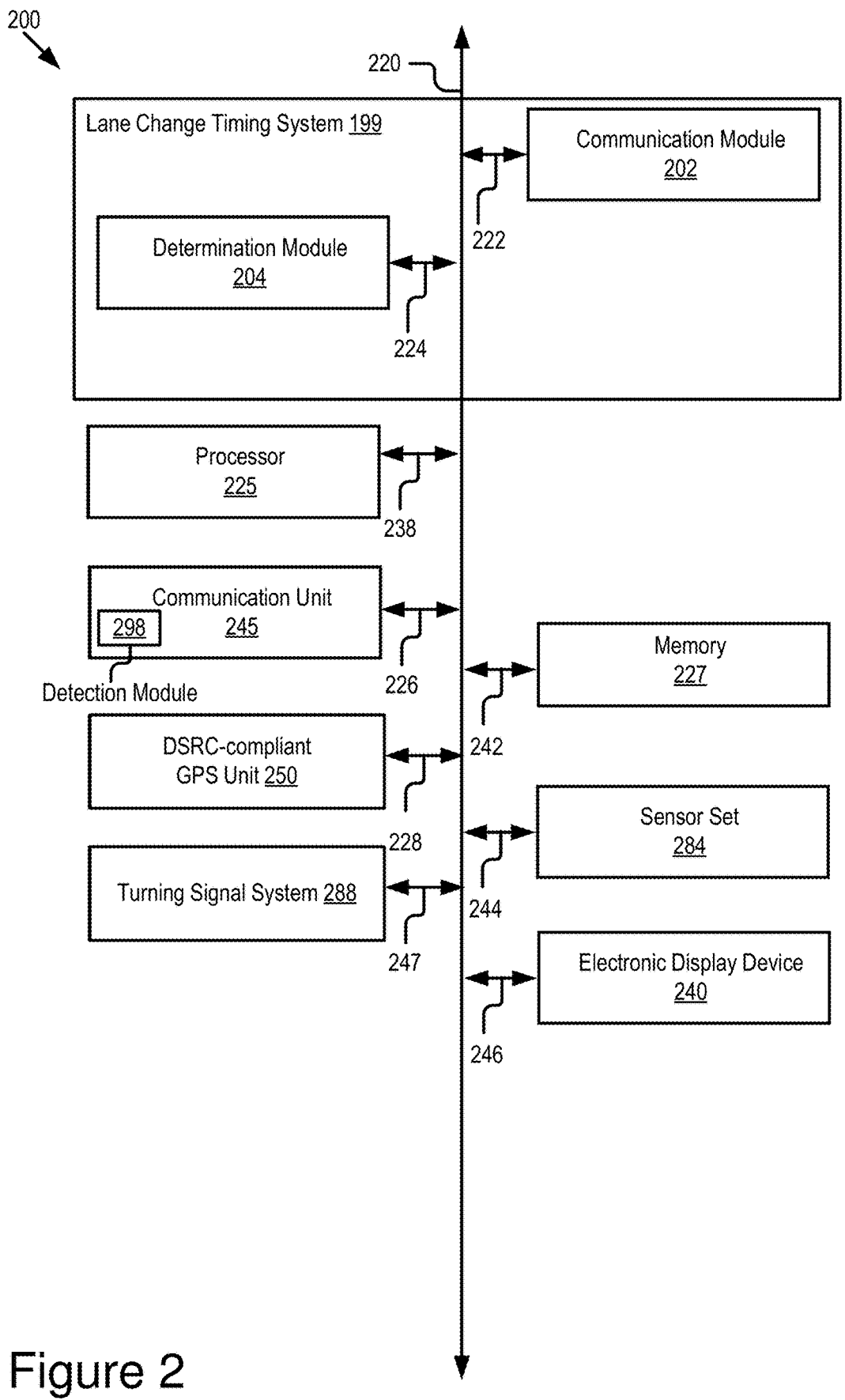
FIG. 2 is a block diagram illustrating an example computer system including the lane change timing system according to some embodiments.

Referring now to FIG. 2, depicted is a block diagram illustrating an example computer system 200 including the lane change timing system 199 according to some embodiments. In some embodiments, the computer system 200 may include a special-purpose computer system that is programmed to perform one or more steps of one or more of the method 300 described below with reference to FIG. 3 and the method 800 described below with reference to FIG. 8.

In some embodiments, the computer system 200 is an onboard vehicle computer of a vehicle such as the ego vehicle 123, the first perimeter vehicle 124 or the Nth perimeter vehicle 128. In some embodiments, the computer system 200 is an onboard unit of the ego vehicle 123, the first perimeter vehicle 124 or the Nth perimeter vehicle 128. In some embodiments, the computer system 200 is an ECU, head unit or some other processor-based computing device of the ego vehicle 123, the first perimeter vehicle 124 or the Nth perimeter vehicle 128.

The computer system 200 includes one or more of the following elements according to some examples: the lane change timing system 199; a processor 225; a communication unit 245; a memory 227; a DSRC-compliant GPS unit 250; a sensor set 284; a turning signal system 288; and an electronic display device 240. The components of the computer system 200 are communicatively coupled by a bus 220.

In the illustrated embodiment, the processor 125 is communicatively coupled to the bus 220 via a signal line 238. The communication unit 245 is communicatively coupled to the bus 220 via a signal line 226. The memory 127 is communicatively coupled to the bus 220 via a signal line 242. The sensor set 284 is communicatively coupled to the bus 220 via a signal line 244. The DSRC-compliant GPS unit 150 is communicatively coupled to the bus 220 via a signal line 228. The sensor set 284 is communicatively coupled to the bus 220 via a signal line 244. The turning signal system 288 is communicatively coupled to the bus 220 via a signal line 247. The electronic display device 240 is communicatively coupled to the bus 220 via a signal line 246.

The processor 225 provides similar functionality as the processor 125 described above with reference to FIG. 1A, and so, that description will not be repeated here. The communication unit 245 provides similar functionality as the communication unit 145 described above with reference to FIG. 1A, and so, that description will not be repeated here. The memory 227 provides similar functionality as the memory 127 described above with reference to FIG. 1A, and so, that description will not be repeated here. The sensor set 284 provides similar functionality as the sensor set 184 described above with reference to FIG. 1A, and so, that description will not be repeated here. The DSRC-compliant GPS unit 250 provides similar functionality as the DSRC-compliant GPS unit 150 described above with reference to FIG. 1A, and so, that description will not be repeated here. The electronic display device 240 provides similar functionality as the electronic display device 140 described above with reference to FIG. 1A, and so, that description will not be repeated here. The turning signal system 288 provides similar functionality as the turning signal system 188 described above with reference to FIG. 1A, and so, that description will not be repeated here. The communication unit 245 includes a detection module 298. The detection module 298 provides similar functionality as the detection module 198 described above with reference to FIG. 1A, and so, that description will not be repeated here.

The memory 227 may store any of the data described above with reference to FIG. 1A or below with reference to FIGS. 3-8. The memory 227 may store any data necessary for the computer system 200 to provide its functionality.

In the illustrated embodiment shown in FIG. 2, the lane change timing system 199 includes: a communication module 202; and a determination module 204

The communication module 202 can be software including routines for handling communications between the lane change timing system 199 and other components of the operating environment 100 of FIG. 1A.

In some embodiments, the communication module 202 can be a set of instructions executable by the processor 225 to provide the functionality described below for handling communications between the lane change timing system 199 and other components of the computer system 200. In some embodiments, the communication module 202 can be stored in the memory 227 of the computer system 200 and can be accessible and executable by the processor 225. The communication module 202 may be adapted for cooperation and communication with the processor 225 and other components of the computer system 200 via signal line 222.

The communication module 202 sends and receives data, via the communication unit 245, to and from one or more elements of the operating environment 100. For example, the communication module 202 receives or transmits, via the communication unit 245, some or all of the digital data stored on the memory 227. The communication module 202 may send or receive any of the digital data or messages described above with reference to FIG. 1A, or below with reference to FIGS. 3-8, via the communication unit 245.

In some embodiments, the communication module 202 receives data from components of the lane change timing system 199 and stores the data in the memory 227 (or a buffer or cache of the memory 227, or a standalone buffer or cache which is not depicted in FIG. 2). For example, the communication module 202 receives the BSM data 197 from the communication unit 245 and stores the BSM data 197 in the memory 227.

In some embodiments, the communication module 202 may handle communications between components of the lane change timing system 199.

In some embodiments, the determination module 204 is software including routines for executing one or more steps of the method 300 described below with reference to FIG. 3. In some embodiments, the determination module 204 is software including routines for executing one or more steps of the method 800 described below with reference to FIG. 8.

In some embodiments, the determination module 204 can be stored in the memory 227 of the computer system 200 and can be accessible and executable by the processor 225. The determination module 204 may be adapted for cooperation and communication with the processor 225 and other components of the computer system 200 via signal line 224.

Referring now to FIG. 3, depicted is a method 300 for providing lane change timing assistance for a connected vehicle according to some embodiments. The steps of the method 300 are executable in any order, and not necessarily the order depicted in FIG. 3.

At step 301, preference data is received from a driver of the ego vehicle.

At step 303, monitoring begins for whether a turning light of the turning signal system of the ego vehicle is activated.

At step 305, the sensor set is activated so that it measures for the sensor data and builds the BSM data. A BSM including the BSM data may be generated and transmitted for reception by one or more perimeter vehicles. In some embodiments, the BSM is broadcast. The BSM may be transmitted using any V2X protocol, including DSRC.

At step 307, the sensor data and the BSM data are stored in a non-transitory memory of the ego vehicle.

At step 309, a turning light of the ego vehicle is detected as being activated.

At step 310, a determination is made regarding whether the left or right turning light is activated. In some embodiments, if the left turning light is activated, then the driver wants to start traveling in the lane that is to the left of the ego vehicle. If the right turning light is activated, then the driver wants to start traveling in the lane that is to the right of the ego vehicle.

At step 311, one or more BSMs are received from one or more perimeter vehicles. Each BSM includes the BSM data of the perimeter vehicle that transmitted the BSM. The BSM data of these perimeter vehicles is stored in the non-transitory memory of the ego vehicle. In some embodiments, a data structure is built that organizes the BSM data of the perimeter vehicles for subsequent use.

At step 312, the sensor data of the ego vehicle measured at step 305 and the BSM data of the perimeter vehicles received at step 311 are analyzed to determine (1) timing data describing an optimum time to begin changing lanes to the lane indicated by the activated turning light [either the lane to the left of the ego vehicle of the lane to the right of the ego vehicle]; and (2) path data describing a path that the driver should take to complete the lane change.

At step 314, graphical data is generated based on the timing data and the path data. The graphical data is operable to cause the electronic display device of the ego vehicle to display graphics that depict the optimum time and the path.

At step 316, the graphical data is provided to the electronic display device specified by the preference data.

At step 318, the electronic display device executes the graphical data to cause the electronic display device to display the graphics.

Referring now to FIG. 4, depicted is a block diagram illustrating an example of the BSM data 197 according to some embodiments.

The regular interval for transmitting BSMs may be user configurable. In some embodiments, a default setting for this interval may be transmitting the BSM every 0.10 seconds or substantially every 0.10 seconds.

A BSM is broadcasted over the 5.9 GHz DSRC band. DSRC range may be substantially 1,000 meters. In some embodiments, DSRC range may include a range of substantially 100 meters to substantially 1,000 meters. DSRC range is generally 300 to 500 meters depending on variables such as topography and occlusions between DSRC-equipped endpoints. In some embodiments, one or more of the vehicles 123, 124 depicted in FIG. 1A and the infrastructure device 122 depicted in FIG. 1A are DSRC-equipped endpoints.

Referring now to FIG. 5, depicted is a block diagram illustrating an example of BSM data 197 according to some embodiments.

A BSM may include two parts. These two parts may include different BSM data 197 as shown in FIG. 12.

Part 1 of the BSM data 197 may describe one or more of the following: the GPS data 192 of the vehicle; vehicle heading; vehicle speed; vehicle acceleration; vehicle steering wheel angle; and vehicle size.

Part 2 of the BSM data 197 may include a variable set of data elements drawn from a list of optional elements. Some of the BSM data 197 included in Part 2 of the BSM are selected based on event triggers, e.g., anti-locking brake system ("ABS") being activated may trigger BSM data 197 relevant to the ABS system of the vehicle.

In some embodiments, some of the elements of Part 2 are transmitted less frequently in order to conserve bandwidth.

Referring now to FIG. 6, depicted is an example of a 3D-HUD 600 according to some embodiments. In some embodiments, the electronic display device 140 is a 3D-HUD 600.

The 3D-HUD 600 includes a projector 1001, a movable screen 1002, a screen-driving unit 1003, an optical system (including lenses 1004, 1006, reflector 1005, etc.). The projector 1001 may be any kind of projector such as a digital mirror device (DMD) project, a liquid crystal projector. The projector 1001 projects an image (graphic) 1008 on the movable screen 1002. The image 1008 may include a virtual object. For example, the image 1008 may be one or more of the path graphic 161 and the timing graphic 162 which depicts the lines of a roadway so that the driver can view the roadway lines using the 3D-HUD 600 when these lines would otherwise be obscured.

The movable screen 1002 includes a transparent plate and so the light of the projected image transmits through the movable screen 1002 to be projected on the windshield 1007 of a vehicle. The image projected on the windshield 1007 is perceived by a driver 1010 as if it is a real object (shown as 1011a, 1011b) that exists in the three-dimensional space of the real-world, as opposed to an object that is projected on the windshield.

The 3D-HUD 600 is capable of controlling the direction of the image relative to the driver 1010 (in other words, the image position in the windshield) by adjusting the projection position on the screen 1002. Further the screen 1002 is movable by the screen-driving unit 1003 in the range between the positions 1003a and 1003b. Adjusting the position of the screen 1002 can vary the depth (distance) of the projected image from the driver 1010 in the real-world. In one example, the movable range of the screen 1002 (distance between positions 1003a and 1003b) may be 5 mm, which correspond to from 5 m away to infinity in the real-world. The use of the 3D-HUD 600 allows the driver 1010 to perceive the projected image exist in the real-world (three-dimensional space). For example, when an image is projected at the same three-dimensional position (or substantially same depth at least) as a real object (such as a traffic light or brake lights of a vehicle), the driver does not need to adjust eye focus in order to view the projected image, resulting in easy grasp of the projected image while looking at the real object.

Figure 7:
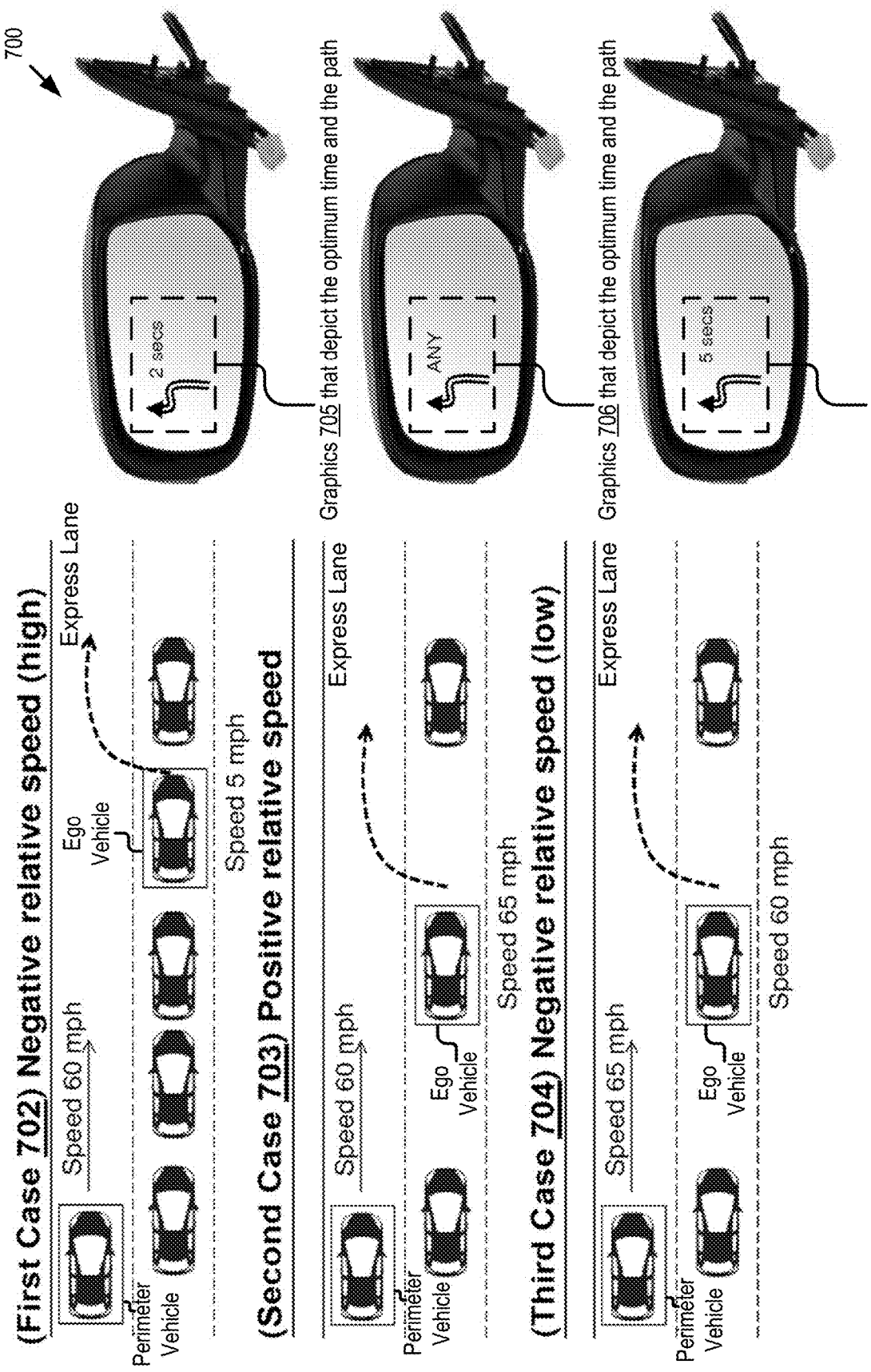
FIG. 7 is a block diagram illustrating an example set of use cases for the lane change timing system according to some embodiments.

Referring now to FIG. 7, depicted is a block diagram illustrating an example set 700 of use cases 702, 703, 704 of the lane change timing system 199 according to some embodiments.

In the first use case 702, a driver of an ego vehicle is traveling 5 miles per hour (mph) and desires to enter an express lane located on the driver side of the ego vehicle. The lane change timing system 199 either uses its onboard sensors to detect a perimeter vehicle traveling 60 mph in the express lane or receives a V2X message from the perimeter vehicle indicating this information about the perimeter vehicle. The lane change timing system 199 determines a path and time for the driver of the ego vehicle to make a maneuver into the express lane. The timing data indicates the that optimally the driver must begin making the maneuver within the next two seconds. The lane change timing system 199 causes an electronic display device to depict graphics 705 that describes the optimum time and the path for the maneuver.

In the second use case 703, a driver of an ego vehicle is traveling 65 mph and desires to enter an express lane located on the driver side of the ego vehicle. The lane change timing system 199 either uses its onboard sensors to detect a perimeter vehicle traveling 60 mph in the express lane or receives a V2X message from the perimeter vehicle indicating this information about the perimeter vehicle. The lane change timing system 199 determines a path and time for the driver of the ego vehicle to make a maneuver into the express lane. The timing data indicates the that optimally the driver can begin to enter the express lane at any time (e.g., because the relative speed of the perimeter vehicle and the ego vehicle). The lane change timing system 199 causes an electronic display device to depict graphics 706 that describes the optimum time and the path for the maneuver.

In the third use case 704, a driver of an ego vehicle is traveling 60 mph and desires to enter an express lane located on the driver side of the ego vehicle. The lane change timing system 199 either uses its onboard sensors to detect a perimeter vehicle traveling 65 mph in the express lane or receives a V2X message from the perimeter vehicle indicating this information about the perimeter vehicle. The lane change timing system 199 determines a path and time for the driver of the ego vehicle to make a maneuver into the express lane. The timing data indicates the that optimally the driver must begin making the maneuver within the next five seconds. The lane change timing system 199 causes an electronic display device to depict graphics 707 that describes the optimum time and the path for the maneuver.

Figure 8:
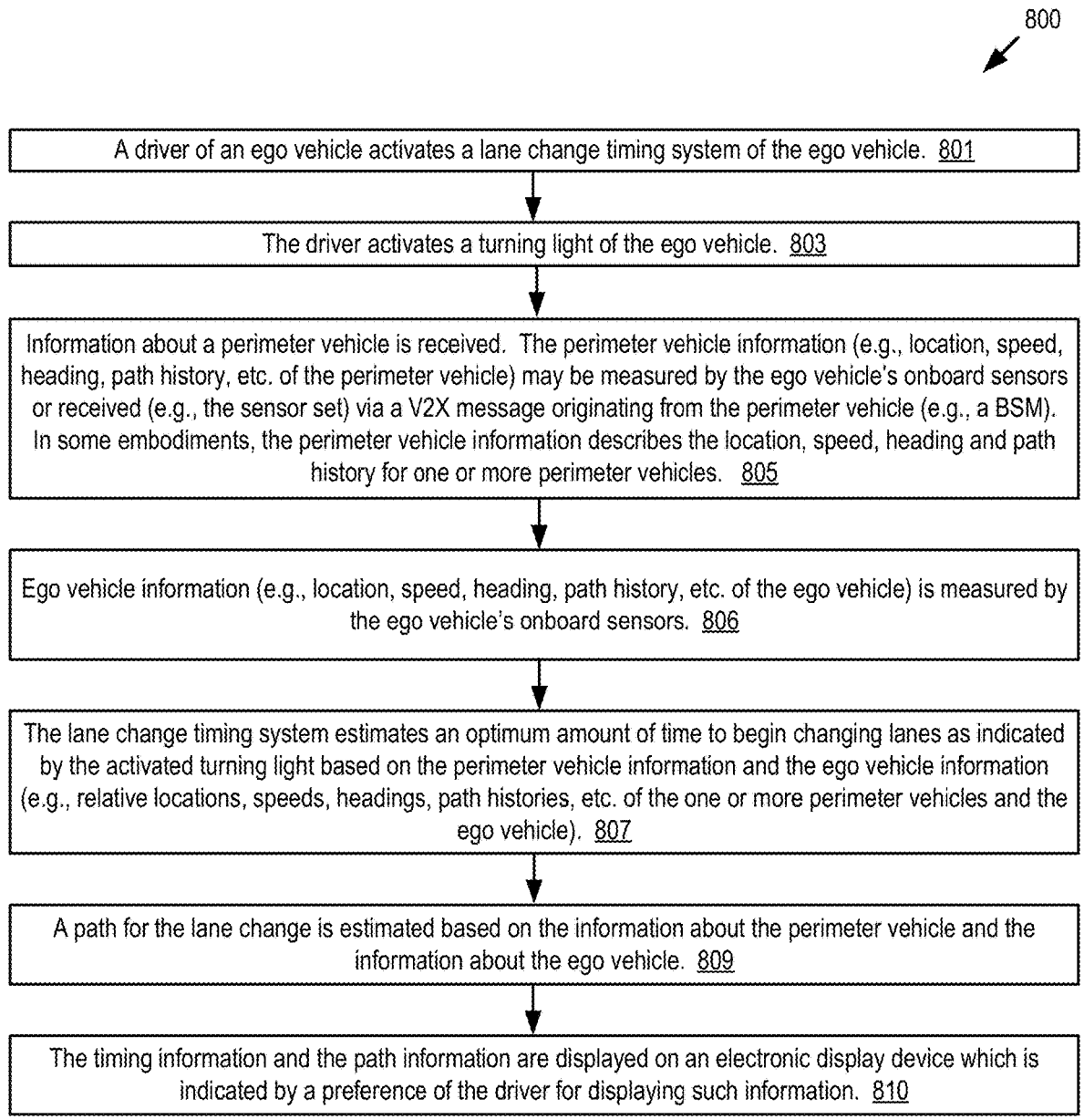
FIG. 8 depicts a method for providing lane change timing assistance for a connected vehicle according to some embodiments.

Referring now to FIG. 8, depicted is a method 800 for providing lane change timing assistance for a connected vehicle according to some embodiments.

At step 801, a driver of an ego vehicle activates a lane change timing system of the ego vehicle. For example, the electronic display device of the ego vehicle depicts a selectable graphic that activates the lane change timing system.

At step 803, the driver of the ego vehicle activates a turning light of the ego vehicle.

At step 805, information about a perimeter vehicle is received. The information about the perimeter vehicle includes information which described above as being received as BSM data included in a BSM. This information about the perimeter vehicle can be measured by the sensor set of the ego vehicle or received in a V2X message (e.g., a BSM) which originates from the perimeter vehicle. The information about the perimeter vehicle describes one or more of the following: a position of the perimeter vehicle; a velocity of the perimeter vehicle; a heading of the perimeter vehicle; a path history of the perimeter vehicle; and any other information included in a BSM as depicted in FIGS. 4 and 5.

At step 806, the sensor set of the ego vehicle records information about the ego vehicle such as that described above for the sensor data. For example, the sensor set of the ego vehicle records information about the ego vehicle that describes one or more of the following: a position of the ego vehicle; a velocity of the ego vehicle; a heading of the ego vehicle; a path history of the ego vehicle; and any other information included in a BSM as depicted in FIGS. 4 and 5.

At step 807, the lane change timing system of the ego vehicle estimates an optimum amount of time to begin a maneuver to change lanes as indicated by the activated turning light. The optimum time is described by timing data. The optimum time is determined by the lane change timing system based on the information about the perimeter vehicle (which may be referred to herein as "perimeter vehicle information") and information about the ego vehicle (which may be referred to herein as "ego vehicle information"). For example, the optimum time is determined by the lane change timing system based on one or more of the following: the relative positions of the ego vehicle and the perimeter vehicle; the relative velocities of the ego vehicle and the perimeter vehicle; the relative headings of the ego vehicle and the perimeter vehicle; and the relative path histories of the ego vehicle and the perimeter vehicle.

At step 809, a path for the lane change is estimated based on the perimeter vehicle information and the ego vehicle information. For example, the path is determined by the lane change timing system based on one or more of the following: the relative positions of the ego vehicle and the perimeter vehicle; the relative velocities of the ego vehicle and the perimeter vehicle; the relative headings of the ego vehicle and the perimeter vehicle; and the relative path histories of the ego vehicle and the perimeter vehicle. The path is described by the path data.

At step 810, the timing information and the path information are displayed on an electronic display device which is indicated by a preference of the driver for displaying such information. The preference of the driver is described by the preference data.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
   receiving, from a perimeter vehicle, a basic safety message (BSM) that describes a heading of the perimeter vehicle and a path history of the perimeter vehicle;
   determining, with an electronic control unit of an ego vehicle, a time and a path for the ego vehicle to change lanes based on the heading of the perimeter vehicle from the BSM, the path history of the perimeter vehicle from the BSM, and sensor data of the ego vehicle; and
   displaying, on an electronic display device of the ego vehicle, one or more graphics that depict the time and the path.

2. The method of claim 1, further comprising:
   detecting that a turning light was activated; and
   responsive to detecting that the turning light was activated, determining that the ego vehicle is going to move from a current lane to a target lane that is left of the ego vehicle;
   wherein determining the time and the path for the ego vehicle to change lanes is based on determining that the ego vehicle is going to move from the current lane to the target lane that is left of the ego vehicle.

3. The method of claim 1, wherein the time and the path are determined based on ego vehicle information that describes the ego vehicle and perimeter vehicle information that describes the perimeter vehicle.

4. The method of claim 3, wherein the path includes instructions to move from a current lane to a target lane and the perimeter vehicle is traveling in the target lane.

5. The method of claim 3, wherein the time and the path are determined based on one or more of the following: relative locations of the ego vehicle and the perimeter vehicle; relative velocities of the ego vehicle and the perimeter vehicle; relative headings of the ego vehicle; and relative path histories of the ego vehicle and the perimeter vehicle.

6. The method of claim 1, wherein the electronic display device is selected from a group that includes: an electronic display installed in a side mirror of the ego vehicle; a heads-up display unit installed in a windshield of the ego vehicle; and a three-dimensional heads-up display unit installed in the windshield of the ego vehicle.

7. The method of claim 1, wherein the method is triggered by an activation of a turning signal of the ego vehicle.

8. The method of claim 1, wherein the electronic display device is installed in a side mirror of the ego vehicle and the one or more graphics displaying the time to change lanes is a time to begin a maneuver to change lanes.

9. A system to help a driver of an ego vehicle avoid a collision, the system comprising:
   an electronic display device;
   a non-transitory memory;
   a processor communicatively coupled to the electronic display device and the non-transitory memory, wherein the non-transitory memory stores computer code that is operable, when executed by the processor, to cause the processor to:
     receive, from a perimeter vehicle, a basic safety message (BSM) that describes a heading of the perimeter vehicle and a path history of the perimeter vehicle;
     determine, by the processor, a time and a path for an ego vehicle to change lanes based on the heading of the perimeter vehicle from the BSM, the path history of the perimeter vehicle from the BSM, and sensor data of the ego vehicle; and display, on the electronic display device, one or more graphics that depict the time and the path.

10. The system of claim 9, wherein the computer code is further operable, when executed by the processor, to:

detect that a turning light was activated; and responsive to detecting that the turning light was activated, determine that the ego vehicle is going to move from a current lane to a target lane that is left of the ego vehicle;

wherein determining the time and the path for the ego vehicle to change lanes is based on determining that the ego vehicle is going to move from the current lane to the target lane that is left of the ego vehicle.

11. The system of claim 9, wherein the path includes instructions to move from a current lane to a target lane and the perimeter vehicle is traveling in the target lane.

12. The system of claim 10, wherein the time and the path are determined based on one or more of the following: relative locations of the ego vehicle and the perimeter vehicle; relative velocities of the ego vehicle and the perimeter vehicle; relative headings of the ego vehicle; and relative path histories of the ego vehicle and the perimeter vehicle.

13. The system of claim 9, wherein the electronic display device is selected from a group that includes: an electronic display installed in a side mirror of the ego vehicle; a heads-up display unit installed in a windshield of the ego vehicle; and a three-dimensional heads-up display unit installed in the windshield of the ego vehicle.

14. The system of claim 9, wherein the electronic display device is installed in a side mirror of the ego vehicle and the time to change lanes is a time to begin a maneuver to change lanes.

15. A computer program product of an ego vehicle comprising instructions that, when executed by an electronic control unit of an ego vehicle, cause the electronic control unit to perform operations comprising:

receiving, from a perimeter vehicle, a basic safety message (BSM) that describes a heading of the perimeter vehicle and a path history of the perimeter vehicle;

determining a time and a path for an ego vehicle to change lanes based on the heading of the perimeter vehicle from the BSM, the path history of the perimeter vehicle from the BSM, and sensor data of the ego vehicle; and displaying, on an electronic display device of the ego vehicle, one or more graphics that depict the time and the path.

16. The computer program product of claim 15, wherein the operations further comprise:

detecting that a turning light was activated; and responsive to detecting that the turning light was activated, determining that the ego vehicle is going to move from a current lane to a target lane that is left of the ego vehicle;

wherein determining the time and the path for the ego vehicle to change lanes is based on determining that the ego vehicle is going to move from the current lane to the target lane that is left of the ego vehicle.

17. The computer program product of claim 16, wherein the path includes instructions to move from a current lane to a target lane and the perimeter vehicle is traveling in the target lane.

18. The computer program product of claim 16, wherein the time and the path are determined based on one or more of the following: relative locations of the ego vehicle and the perimeter vehicle; relative velocities of the ego vehicle and the perimeter vehicle; relative headings of the ego vehicle; and relative path histories of the ego vehicle and the perimeter vehicle.

19. The computer program product of claim 15, wherein the electronic display device is selected from a group that includes: an electronic display installed in a side mirror of the ego vehicle; a heads-up display unit installed in a windshield of the ego vehicle; and a three-dimensional heads-up display unit installed in the windshield of the ego vehicle.

20. The computer program product of claim 15, wherein the electronic display device is installed in a side mirror of the ego vehicle and the time to change lanes is a time to begin a maneuver to change lanes.

* * * * *